(12) United States Patent
Briggs et al.

(10) Patent No.: US 8,342,929 B2
(45) Date of Patent: Jan. 1, 2013

(54) SYSTEMS AND METHODS FOR INTERACTIVE GAME PLAY

(75) Inventors: Rick A. Briggs, Springfield, IL (US); Denise Weston, Wakefield, RI (US)

(73) Assignee: Creative Kingdoms, LLC, Wakefield, RI (US)

( * ) Notice: Subject to any disclaimer, the term of this patent is extended or adjusted under 35 U.S.C. 154(b) by 241 days.

(21) Appl. No.: 12/829,905

(22) Filed: Jul. 2, 2010

(65) Prior Publication Data
US 2010/0273556 A1    Oct. 28, 2010

Related U.S. Application Data

(63) Continuation of application No. 09/545,658, filed on Apr. 10, 2000, now Pat. No. 7,749,089, which is a continuation-in-part of application No. 09/514,480, filed on Feb. 28, 2000, now Pat. No. 6,634,949.

(60) Provisional application No. 60/122,137, filed on Feb. 26, 1999, provisional application No. 60/128,318, filed on Apr. 8, 1999.

(51) Int. Cl.
*A63F 9/24*    (2006.01)
(52) U.S. Cl. .............................................. 463/9; 463/39
(58) Field of Classification Search ............... 463/39, 463/9
See application file for complete search history.

(56) References Cited

U.S. PATENT DOCUMENTS

| | | | |
|---|---|---|---|
| 3,395,920 A | 8/1968 | Moe | |
| 3,707,055 A | 12/1972 | Pearce | |
| 3,795,805 A | 3/1974 | Swanberg et al. | |
| 3,949,364 A | 4/1976 | Clark et al. | |
| 3,997,156 A | 12/1976 | Barlow et al. | |
| 4,063,111 A | 12/1977 | Dobler et al. | |

(Continued)

FOREIGN PATENT DOCUMENTS

CN    1032246    4/1989

(Continued)

OTHER PUBLICATIONS

"Gatemaster Features", internet article: http://web.archive.org/web/19970709135000/www.gatemaster.com/gmfeat.htm, Jul. 9, 1997, 4 pages.*

(Continued)

*Primary Examiner* — Arthur O. Hall
*Assistant Examiner* — Steve Rowland
(74) *Attorney, Agent, or Firm* — Knobbe, Martens, Olson & Bear LLP

(57) ABSTRACT

A multi-media interactive play system has a number of play elements situated in a variety of play environments or play media. The play elements are linked to a common record of participant performance, progress, character attributes, etc. The participant's performance in the play elements determines the play elements to which the participant may proceed as well as the play parameters of the play element in which the participant is currently involved. The play elements are thus interlinked to define a sequence or path network along which the participant advances. By advancing through the play elements the participant carries out a plot, story, theme, etc. that attaches a significance to the successful completion of a given play element or elements. Also disclosed in a variety of play elements suitable for use in the system, an example of a plot or theme that may be carried out by the system, and a send/receive radio frequency network that may be used to track play participants in a play center.

21 Claims, 10 Drawing Sheets

U.S. PATENT DOCUMENTS

| | | | |
|---|---|---|---|
| 4,171,737 A | 10/1979 | McLaughlin | |
| 4,282,681 A | 8/1981 | McCaslin | |
| 4,296,929 A | 10/1981 | Meyer et al. | |
| 4,412,205 A | 10/1983 | Von Kemenczky | |
| 4,678,450 A | 7/1987 | Scolari et al. | |
| 4,695,058 A | 9/1987 | Carter, III et al. | |
| 4,695,953 A | 9/1987 | Blair et al. | |
| 4,817,950 A | 4/1989 | Goo | |
| 4,858,930 A | 8/1989 | Sato | |
| 4,891,032 A | 1/1990 | Davis | |
| 4,904,222 A | 2/1990 | Gastgeb et al. | |
| 4,910,677 A | 3/1990 | Remedio et al. | |
| 4,967,321 A | 10/1990 | Cimock | |
| 5,036,442 A | 7/1991 | Brown | |
| RE33,662 E | 8/1991 | Blair et al. | |
| 5,048,831 A | 9/1991 | Sides | |
| 5,076,584 A | 12/1991 | Openiano | |
| 5,114,155 A | 5/1992 | Tillery et al. | |
| 5,114,344 A | 5/1992 | Fumagalli et al. | |
| 5,127,657 A | 7/1992 | Ikezawa et al. | |
| 5,177,311 A | 1/1993 | Suzuki et al. | |
| 5,194,006 A | 3/1993 | Zaenglein, Jr. | |
| 5,194,048 A | 3/1993 | Briggs | |
| 5,223,698 A | 6/1993 | Kapur | |
| 5,231,568 A | 7/1993 | Cohen et al. | |
| 5,236,200 A | 8/1993 | McGregor et al. | |
| 5,292,124 A | 3/1994 | Carpenter | |
| 5,292,254 A | 3/1994 | Miller et al. | |
| 5,319,548 A | 6/1994 | Germain | |
| 5,320,358 A | 6/1994 | Jones | |
| 5,320,362 A | 6/1994 | Bear et al. | |
| 5,354,057 A | 10/1994 | Pruitt et al. | |
| 5,356,343 A | 10/1994 | Lovetere | |
| 5,365,214 A | 11/1994 | Angott et al. | |
| 5,366,229 A | 11/1994 | Suzuki | |
| 5,378,197 A | 1/1995 | Briggs | |
| 5,382,026 A | 1/1995 | Harvard et al. | |
| 5,393,074 A | 2/1995 | Bear et al. | |
| 5,405,294 A | 4/1995 | Briggs | |
| 5,411,269 A | 5/1995 | Thomas | |
| 5,453,758 A | 9/1995 | Sato | |
| 5,459,489 A | 10/1995 | Redford | |
| 5,482,510 A | 1/1996 | Ishii et al. | |
| 5,488,362 A | 1/1996 | Ullman et al. | |
| 5,498,002 A | 3/1996 | Gechter | |
| 5,516,105 A | 5/1996 | Eisenbrey et al. | |
| 5,550,721 A | 8/1996 | Rapisarda | |
| 5,554,033 A | 9/1996 | Bizzi et al. | |
| 5,580,319 A | 12/1996 | Hamilton | |
| 5,587,740 A | 12/1996 | Brennan | |
| 5,647,796 A | 7/1997 | Cohen | |
| 5,649,867 A | 7/1997 | Briggs | |
| 5,651,049 A | 7/1997 | Easterling et al. | |
| 5,655,053 A | 8/1997 | Renie | |
| 5,662,525 A | 9/1997 | Briggs | |
| 5,674,128 A | 10/1997 | Holch et al. | |
| 5,741,182 A | 4/1998 | Lipps et al. | |
| 5,741,189 A | 4/1998 | Briggs | |
| 5,751,273 A | 5/1998 | Cohen | |
| 5,752,880 A | 5/1998 | Gabai et al. | |
| 5,752,882 A | 5/1998 | Acres et al. | |
| 5,757,305 A | 5/1998 | Xydis | |
| 5,757,360 A | 5/1998 | Nitta et al. | |
| 5,770,533 A | 6/1998 | Franchi | |
| 5,772,508 A | 6/1998 | Sugita et al. | |
| 5,775,998 A | 7/1998 | Ikematsu et al. | |
| 5,785,592 A | 7/1998 | Jacobsen | |
| 5,786,626 A | 7/1998 | Brady et al. | |
| 5,810,666 A | 9/1998 | Mero et al. | |
| 5,811,896 A | 9/1998 | Grad | |
| 5,820,471 A | 10/1998 | Briggs | |
| 5,820,472 A | 10/1998 | Briggs | |
| 5,830,065 A | 11/1998 | Sitrick | |
| 5,833,549 A | 11/1998 | Zur et al. | |
| 5,835,576 A | 11/1998 | Katz | |
| 5,836,817 A | 11/1998 | Acres et al. | |
| 5,851,149 A | 12/1998 | Xidos et al. | |
| 5,853,332 A | 12/1998 | Briggs | |
| 5,855,483 A | 1/1999 | Collins et al. | |
| 5,865,680 A | 2/1999 | Briggs | |
| 5,901,246 A | 5/1999 | Hoffberg et al. | |
| 5,924,695 A | 7/1999 | Heykoop | |
| 5,929,841 A | 7/1999 | Fujii | |
| 5,929,848 A * | 7/1999 | Albukerk et al. | 715/700 |
| 5,942,969 A | 8/1999 | Wicks | |
| 5,944,533 A | 8/1999 | Wood | |
| 5,946,444 A | 8/1999 | Evans et al. | |
| 5,963,136 A | 10/1999 | O'Brien | |
| 5,964,660 A | 10/1999 | James et al. | |
| 5,967,901 A | 10/1999 | Briggs | |
| 5,971,270 A | 10/1999 | Barna | |
| 5,984,788 A | 11/1999 | Lebensfeld et al. | |
| 5,989,120 A | 11/1999 | Truchsess | |
| 5,996,033 A | 11/1999 | Chiu-Hao | |
| 6,001,015 A | 12/1999 | Nishiumi et al. | |
| 6,009,458 A | 12/1999 | Hawkins et al. | |
| 6,012,984 A | 1/2000 | Roseman | |
| 6,025,830 A | 2/2000 | Cohen | |
| 6,075,443 A | 6/2000 | Schepps et al. | |
| 6,076,734 A | 6/2000 | Dougherty et al. | |
| 6,077,106 A | 6/2000 | Mish | |
| 6,089,987 A | 7/2000 | Briggs | |
| 6,129,549 A | 10/2000 | Thompson | |
| 6,132,318 A | 10/2000 | Briggs | |
| 6,144,367 A | 11/2000 | Berstis | |
| 6,150,947 A | 11/2000 | Shima | |
| 6,154,723 A | 11/2000 | Cox et al. | |
| 6,162,122 A | 12/2000 | Acres et al. | |
| 6,162,123 A | 12/2000 | Woolston | |
| 6,174,242 B1 | 1/2001 | Briggs et al. | |
| 6,186,902 B1 | 2/2001 | Briggs | |
| 6,196,893 B1 | 3/2001 | Casola et al. | |
| 6,200,216 B1 | 3/2001 | Peppel | |
| 6,206,782 B1 | 3/2001 | Walker et al. | |
| 6,210,287 B1 | 4/2001 | Briggs | |
| 6,214,155 B1 | 4/2001 | Leighton | |
| 6,220,965 B1 | 4/2001 | Hanna et al. | |
| 6,224,486 B1 | 5/2001 | Walker et al. | |
| 6,231,451 B1 | 5/2001 | Briggs | |
| 6,234,803 B1 | 5/2001 | Watkins | |
| 6,238,289 B1 | 5/2001 | Sobota et al. | |
| RE37,220 E | 6/2001 | Rapisarda et al. | |
| 6,248,019 B1 | 6/2001 | Mudie et al. | |
| 6,254,101 B1 | 7/2001 | Young | |
| 6,254,394 B1 | 7/2001 | Draper et al. | |
| 6,261,180 B1 | 7/2001 | Lebensfeld et al. | |
| 6,264,202 B1 | 7/2001 | Briggs | |
| 6,265,984 B1 | 7/2001 | Molinaroli | |
| 6,273,425 B1 | 8/2001 | Westfall et al. | |
| 6,280,327 B1 | 8/2001 | Leifer et al. | |
| 6,280,328 B1 | 8/2001 | Holch et al. | |
| 6,283,871 B1 | 9/2001 | Briggs | |
| 6,290,566 B1 | 9/2001 | Gabai et al. | |
| 6,302,793 B1 | 10/2001 | Fertitta, III et al. | |
| 6,302,796 B1 | 10/2001 | Lebensfeld et al. | |
| 6,311,982 B1 | 11/2001 | Lebensfeld et al. | |
| 6,320,495 B1 | 11/2001 | Sporgis | |
| 6,328,648 B1 | 12/2001 | Walker et al. | |
| 6,330,427 B1 | 12/2001 | Tabachnik | |
| 6,332,840 B1 | 12/2001 | Nishiumi et al. | |
| 6,342,010 B1 | 1/2002 | Slifer | |
| 6,350,199 B1 | 2/2002 | Williams et al. | |
| 6,352,478 B1 | 3/2002 | Gabai et al. | |
| 6,368,177 B1 | 4/2002 | Gabai et al. | |
| 6,369,908 B1 | 4/2002 | Frey et al. | |
| 6,371,375 B1 | 4/2002 | Ackley et al. | |
| 6,375,578 B1 | 4/2002 | Briggs | |
| 6,383,079 B1 | 5/2002 | Takeda et al. | |
| 6,404,409 B1 | 6/2002 | Solomon | |
| 6,409,379 B1 | 6/2002 | Gabathuler et al. | |
| 6,414,589 B1 | 7/2002 | Angott et al. | |
| 6,426,741 B1 | 7/2002 | Goldsmith et al. | |
| 6,438,193 B1 | 8/2002 | Ko | |
| 6,463,257 B1 | 10/2002 | Wood | |
| 6,482,067 B1 | 11/2002 | Pickens | |
| 6,490,409 B1 | 12/2002 | Walker | |
| 6,509,217 B1 | 1/2003 | Reddy | |

| | | |
|---|---|---|
| 6,525,660 B1 | 2/2003 | Surintspanont |
| 6,526,158 B1 | 2/2003 | Goldberg |
| 6,527,646 B1 | 3/2003 | Briggs |
| 6,545,661 B1 | 4/2003 | Goschy et al. |
| 6,551,188 B2 | 4/2003 | Toyama et al. |
| 6,569,023 B1 | 5/2003 | Briggs |
| 6,592,461 B1 | 7/2003 | Raviv et al. |
| 6,607,123 B1 | 8/2003 | Jollifee et al. |
| 6,608,563 B2 | 8/2003 | Weston et al. |
| 6,609,969 B1 | 8/2003 | Luciano et al. |
| 6,626,728 B2 | 9/2003 | Holt |
| 6,634,949 B1 | 10/2003 | Briggs et al. |
| 6,641,482 B2 | 11/2003 | Masuyama et al. |
| 6,651,268 B1 | 11/2003 | Briggs |
| 6,676,524 B1 | 1/2004 | Botzas |
| 6,682,074 B2 | 1/2004 | Weston |
| 6,702,672 B1 | 3/2004 | Angell et al. |
| 6,729,934 B1 | 5/2004 | Driscoll et al. |
| 6,733,390 B2 | 5/2004 | Walker et al. |
| 6,746,334 B1 | 6/2004 | Barney |
| 6,761,637 B2 | 7/2004 | Weston et al. |
| 6,773,325 B1 | 8/2004 | Mawle et al. |
| 6,773,344 B1 | 8/2004 | Gabai et al. |
| 6,796,908 B2 | 9/2004 | Weston |
| 6,967,566 B2 | 11/2005 | Weston et al. |
| 7,029,400 B2 | 4/2006 | Briggs |
| 7,066,781 B2 | 6/2006 | Weston |
| RE39,818 E | 9/2007 | Slifer |
| 7,445,550 B2 | 11/2008 | Barney et al. |
| 7,488,231 B2 | 2/2009 | Weston |
| 7,500,917 B2 | 3/2009 | Barney et al. |
| 7,524,246 B2 | 4/2009 | Briggs et al. |
| 7,572,191 B2 | 8/2009 | Weston et al. |
| 7,614,958 B2 | 11/2009 | Weston et al. |
| 7,674,184 B2 | 3/2010 | Briggs et al. |
| 7,749,089 B1 | 7/2010 | Briggs et al. |
| 7,850,527 B2 | 12/2010 | Barney et al. |
| 7,878,905 B2 | 2/2011 | Weston et al. |
| 7,896,742 B2 | 3/2011 | Barney et al. |
| 8,021,239 B2 | 9/2011 | Weston et al. |
| 8,089,458 B2 | 1/2012 | Barney et al. |
| 8,164,567 B1 | 4/2012 | Barney et al. |
| 8,169,406 B2 | 5/2012 | Barney et al. |
| 8,184,097 B1 | 5/2012 | Barney et al. |
| 8,226,493 B2 | 7/2012 | Briggs et al. |
| 2001/0018361 A1 | 8/2001 | Acres |
| 2001/0034257 A1 | 10/2001 | Weston et al. |
| 2001/0039206 A1 | 11/2001 | Peppel |
| 2001/0040591 A1 | 11/2001 | Abbott et al. |
| 2001/0054082 A1 | 12/2001 | Rudolph et al. |
| 2002/0005787 A1 | 1/2002 | Gabai et al. |
| 2002/0032067 A1 | 3/2002 | Barney |
| 2002/0038267 A1 | 3/2002 | Can et al. |
| 2002/0052238 A1 | 5/2002 | Muroi |
| 2002/0058459 A1 | 5/2002 | Holt |
| 2002/0090985 A1 | 7/2002 | Tochner et al. |
| 2002/0107591 A1 | 8/2002 | Gabai et al. |
| 2002/0193047 A1 | 12/2002 | Weston |
| 2003/0036425 A1 | 2/2003 | Kaminkow et al. |
| 2003/0037075 A1 | 2/2003 | Hannigan et al. |
| 2003/0114233 A1 | 6/2003 | Hiei |
| 2003/0171145 A1 | 9/2003 | Rowe |
| 2003/0195037 A1 | 10/2003 | Vuong et al. |
| 2004/0033833 A1 | 2/2004 | Briggs et al. |
| 2004/0102247 A1 | 5/2004 | Smoot et al. |
| 2004/0198158 A1 | 10/2004 | Driscoll et al. |
| 2004/0204240 A1 | 10/2004 | Barney |
| 2004/0214642 A1 | 10/2004 | Beck |
| 2005/0156883 A1 | 7/2005 | Wilson et al. |
| 2005/0266907 A1 | 12/2005 | Weston et al. |
| 2006/0287030 A1 | 12/2006 | Briggs et al. |
| 2007/0066396 A1 | 3/2007 | Weston et al. |
| 2008/0014835 A1 | 1/2008 | Weston et al. |
| 2008/0183678 A1 | 7/2008 | Weston |
| 2009/0124165 A1 | 5/2009 | Weston |
| 2009/0156309 A1 | 6/2009 | Weston et al. |
| 2010/0056285 A1 | 3/2010 | Weston et al. |
| 2011/0081970 A1 | 4/2011 | Barney et al. |
| 2011/0300941 A1 | 12/2011 | Weston et al. |
| 2012/0034980 A1 | 2/2012 | Weston et al. |

FOREIGN PATENT DOCUMENTS

| | | |
|---|---|---|
| EP | 0 546 844 | 6/1993 |
| JP | 63-186687 | 8/1988 |
| JP | 03-210622 | 9/1991 |
| JP | 08-191953 | 7/1996 |
| JP | 09-164273 | 6/1997 |
| JP | 10-235019 | 9/1998 |
| JP | 2000-033184 | 2/2000 |
| JP | 2000-308756 | 11/2000 |
| WO | WO 96/14115 | 5/1996 |
| WO | WO 97/28864 | 8/1997 |
| WO | WO 00/61251 | 10/2000 |
| WO | WO 02/47013 | 6/2002 |
| WO | WO 03/044743 | 5/2003 |

OTHER PUBLICATIONS

Digital ID Cards The Next generation of "smart cards" will have more than a one-track mind, *Wall Street Journal*, Jun. 25, 2001.

Raise High the 3D Roof Beam Business Week Nov. 26, 2001.

Tech Designers Rethink Toys: Make Them Fun Wall Street Journal, Dec. 17, 2001.

"Gatemaster Features", internet article; http://web.archive.org/web/10070709135000/www.gatemaster.com/gmfeat.htm, 6 pages.

Badler et al; "Multi-Dimensional Input Techniques and Articulated Figure Positioning by Multiple Constraints", Interactive 3D Graphics, Oct. 1986; pp. 151-169.

D.W. Kormos et al., "Intraoperative, Real-Time 3-D Digitizer for Neurosurgical Treatment and Planning," 1993; 1 page.

Druin et al; Robots: Exploring New Technologies for Learning for Kids; 2000; Chapter One: To Mindstorms and Beyond; 27 pages.

Hunter G. Hoffman, "Physically Touching Virtual Objects Using Tactile Augmentation Enhances the Realism of Virtual Environments," IEEE Virtual Reality Annual International Symposium '98, Atlanta, Georgia, 1998, 5 pages.

James H. Clark, "Designing Surfaces in 3-D," Graphics and Image Processing—Communications of the ACM, Aug. 1976; vol. 19; No. 8; pp. 454-460.

James H. Clark, "Three Dimensional Man Machine Interaction," Siggraph '76, Jul. 14-16 Philadelphia, Pennsylvania, 1 page.

Michael F. Deering, "HoloSketch a Virtual Reality Sketching Animation Tool," ACM Transactions on Computer-Human Interaction, Sep. 1995; vol. 2, No. 3; pp. 220-238.

New Strait Times Press Release, "Microsoft's New Titles," 1998, 1 page.

Nintendo Tilt Controller Ad, Electronic Gaming Monthly, 1994, 1 page.

"Emerald Forest Toys" [online] [retrieved on Sep. 14, 2005], retrieved from Internet <URL:http://www.pathworks.net/print_eft.html>.

International Preliminary Examination Report, International App. No. PCT/US00/09482; dated Apr. 24, 2001; 4 pages.

International Search Report and Written Opinion; International Appl. No. PCT/US2006/043915; mailed Mar. 9, 2007; 8 pages.

International Search Report and Written Opinion, International App. No. PCT/US04/08912; mailed Aug. 26, 2004; 10 pages.

International Search Report and Written Opinion, International App. No. PCT/US05/34831; mailed Jul. 2, 2008; 11 pages.

"Owl Magic Wand and Owl Magic Orb" Press Release by Emerald Forest Toys (Nov. 2001).

R. Borovoy et al., "Things that Blink: Computationally Augmented Name Tags," IBM Systems Journal, vol. 35, Nos. 3 & 4, 1996; pp. 488-495.

Resnick et al; Digital Manipulatives: New Toys to Think With; Apr. 1998; 7 pages.

Richard Borovoy et al., "Groupwear: Nametags That Tell About Relationships," Chi 98, Apr. 1998, pp. 329-330.

Vanessa Colella et al., "Participatory Simulations: Using Computational Objects to Learn about Dynamic Systems," Chi 98; Apr. 1998, pp. 9-10.

Green, et al., Camping in the digital wilderness: tents and flashlights as interfaces to the virtual worlds; Apr. 2002; 2 pages.

* cited by examiner

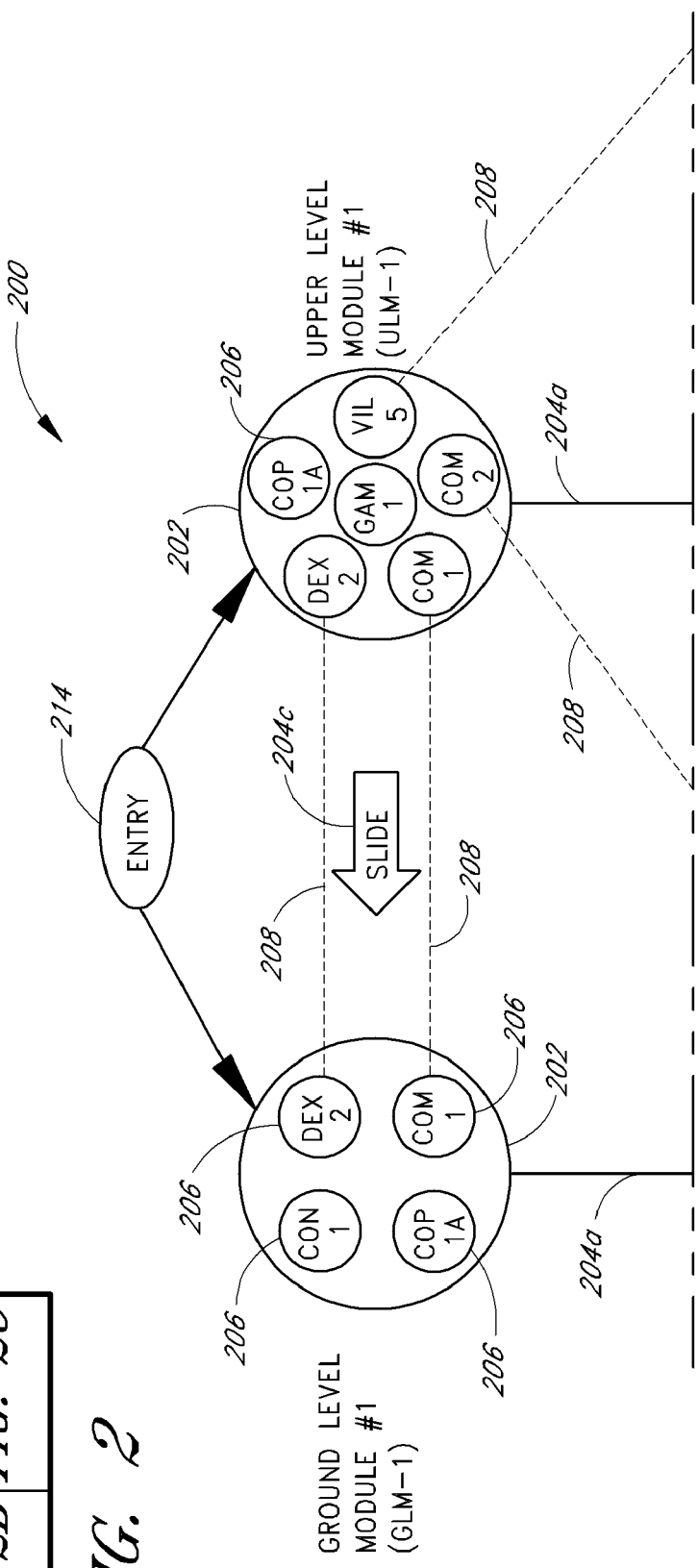

| GROUND LEVEL MAZE (Basic Skills) | UPPER LEVEL MODULES (Advanced Skills) |
|---|---|
| A. Recorded greeting and welcome | A. Recorded greeting and welcome |
| B. Explore maze to first ground level Module (GLM-1) | B. Climb to first Upper Level Module (ULM-1) |

GLM - #1
- CON-1: Build A Wall
- COM-1: Navigate the Maze ◄────────────►
- COP-1A: Simultaneous (button only)
- DEX-2: Throwing Skills ◄────────────►

ULM - #1
- GAM-1: Hide and Seek (button only)
- COM-1: Navigate the Maze
- COP-1A: Simultaneous (button only)
- DEX-2: Throwing Skills
- COM-2: Station Buttons
- VIL-5: Video Gags

GLM - #2
- QUE-1: Key Quest
- COM-2: Station Buttons ◄────────────
- DEX-4: Ball Drop ◄────────────
- CON-2: Build a Structure
- GAM-1: Hide and Seek (button only)

ULM - #2
- COP-1A: Simultaneous (start station)
- QUE-1: Key Quest
- DEX-4: Ball Drop
- COM-3: 20 Questions
- VIL-4: Surveillance

GLM - #3
Must have 1 Key and 100 points to enter
- VIL-4: Surveillance
- DEX-4: Ball Drop ◄────────────
- COP-1B: Simultaneous (start station)
- DEX-3: Shooting Skills ────────
- VIL-5: I Spy ◄────────────

ULM - #3
Must have 2 Keys and 150 points to enter
- COM-3: 20 Questions
- DEX-4: Ball Drop
- COP-1B: Simultaneous (button only)
- GAM-1: Hide and Seek (button only)
- HIS-2: Re-creation

GLM - #4
- VIL-5: Video Gags ◄────────────
- QUE-1: Key Quest
- DEX-1: Wack-a-Mole
- COM-3: 20 Questions ◄────────────
- MEM-1: Numbers
- COM-2: Station Buttons ◄────────────

ULM - #4
- DEX-3: Shooting Skills
- VIL-5: I Spy
- QUE-1: Key Quest
- MEM-3: Shapes
- COP-1B: Simultaneous (start station)
- VIL-3: Fake-out

GLM - #5
- COM-3: 20 Questions ◄────────────
- GAM-1: Hide and Seek (start station)
- PS-2: Computeerized ────────────
- COP1B: Simultaneous (button only)
- HIS-1: Trivia
- CON-3: Build a Bridge

ULM - #5
- VIL-3: Fake-out
- PUZ-3: Common Thread
- PS-2: Computerized
- COM-2: Station Buttons
- MEM-4: Musical Notes
- GAM-1: Hide and Seek (button only)

Connecting Modules
MEC-2: GEARS

*FIG. 3*

SYSTEMS AND METHODS FOR INTERACTIVE GAME PLAY

RELATED APPLICATIONS

This application is a continuation of and claims priority benefit under 35 U.S.C. §120 from U.S. patent application Ser. No. 09/545,658, filed Apr. 10, 2000, and entitled "MULTI-MEDIA INTERACTIVE PLAY SYSTEM," which is hereby incorporated herein by reference in its entirety and which claims priority benefit under 35 U.S.C. §119(e) from U.S. Provisional Application No. 60/128,318, filed Apr. 8, 1999, and is a continuation-in-part of U.S. patent application Ser. No. 09/514,480, filed Feb. 28, 2000, now U.S. Pat. No. 6,634,949, entitled "MULTI-MEDIA INTERACTIVE PLAY SYSTEM," which claims priority benefit under 35 U.S.C. §119(e) from U.S. Provisional Application No. 60/122,137, filed Feb. 26, 1999, and entitled "LINKS INTERACTIVE SYSTEMS."

BACKGROUND

1. Field of the Invention

The present invention relates to play systems, and specifically to a framework for interactive games involving a broad range of game activities and play media.

2. Description of the Related Art

Family entertainment centers, play structures and other similar facilities are well known for providing play and interaction among play participants playing in, or around the entertainment facilities and/or play structure. See, for example, U.S. Pat. No. 5,853,332 to Briggs, incorporated herein by reference. A wide variety of commercially available play toys and games are also known for providing valuable learning and entertainment opportunities for children, such as role playing, reading, memory stimulation, tactile coordination and the like.

However, there is always demand for more exciting and entertaining play structures and play toys that increase the learning and entertainment opportunities for children.

SUMMARY

In accordance with one preferred embodiment a multi-media interactive play system comprises a number of play elements such as a maze that the participant must navigate, a set of trivia questions that the participant must answer, or number of targets that the participant must shoot with a water blaster or laser gun. The play elements are situated in a variety of play environments, and a central scoring system interfaces with the play elements. The scoring system electronically exchanges data with the play elements. For example, the exchanged data may comprise a participant's identity, game progress and performance. The exchanged data may also comprise play element parameters that correspond to the participant's progress, performance, and ability level, and the set of play elements to which the participant may proceed. The play elements are interlinked by the electronic system to define a sequence or path network along which a participant proceeds in the course of completing the play elements or reaching a stated performance standard.

In accordance with another preferred embodiment a method of interactive play comprises the steps of providing a number of play elements situated in a variety of play environments, recording a participant's performance in the play elements, and selecting a set of additional play elements or play environments to which the participant may proceed based on the recorded participant performance. The method may also comprise the step of setting various play parameters in a play element based on the recorded participant performance.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

Having thus summarized the general nature of the invention and its essential features and advantages, certain preferred embodiments and modifications thereof will become apparent to those skilled in the art from the detailed description herein having reference to the figures that follow, of which:

FIG. 2, which is divided into FIGS. 2A-2C, is a schematic diagram of a play arena for use in a multi-media interactive play system;

FIG. 3 is a chart detailing the codes that identify play elements shown in FIG. 2;

DETAILED DESCRIPTION OF THE PREFERRED EMBODIMENTS

Overview

Figure 1:
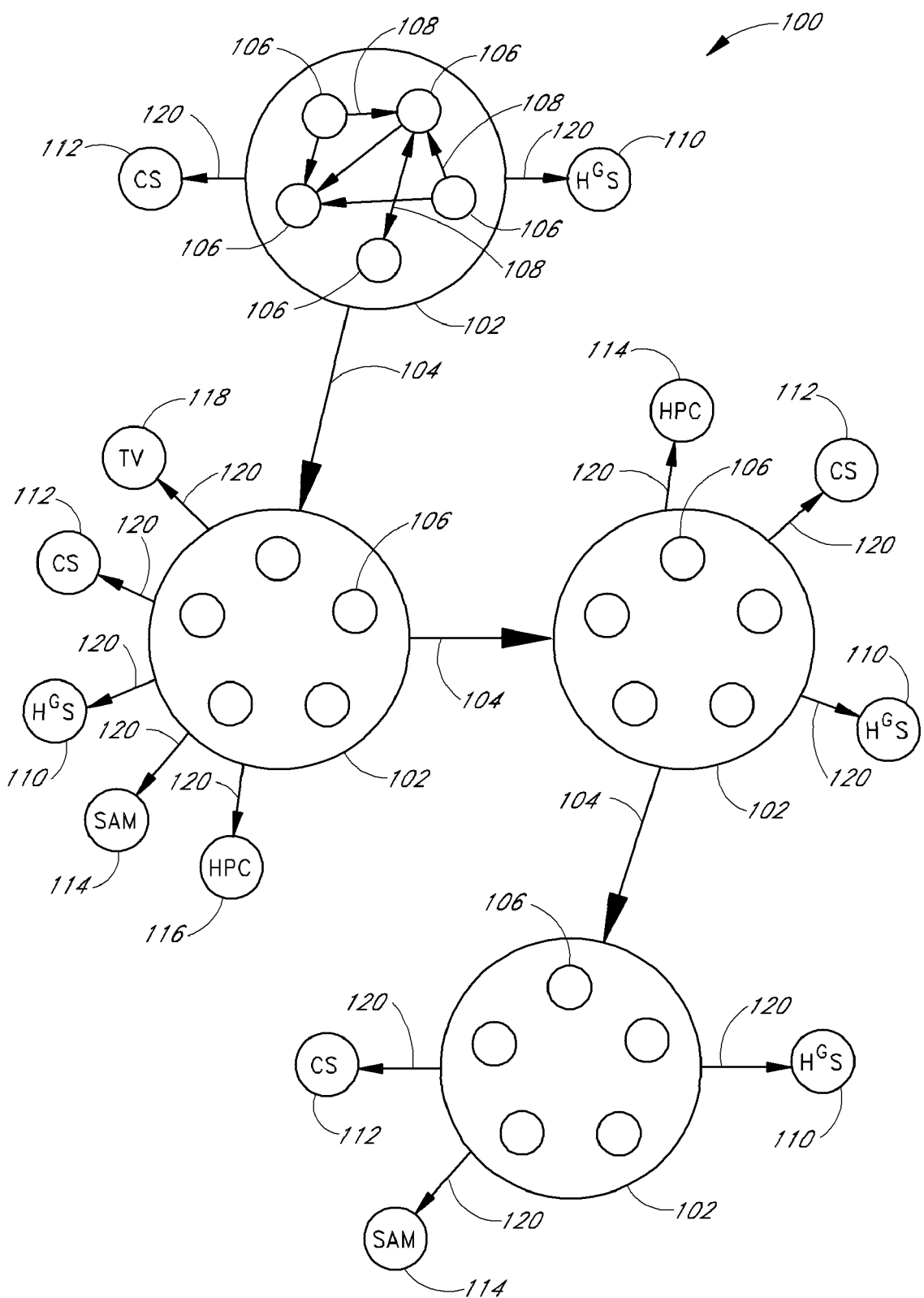
FIG. 1 is a schematic diagram of a play world for use in a multi-media interactive play system.

Conceptually, the multi-media interactive play system (hereinafter "Links") is a framework for various interactive games in which a participant must complete a number of challenges or play elements which are conceptually, qualitatively, sensually, geographically, or otherwise distinct but are nonetheless related to an overall quest, mission, or set of quests or missions. The play elements may, alternatively or additionally, be related to an overall record of the participant's identity associated with his or her game status, character attributes, progress, points, credits, or the like.

A central Links system, such as a computer system or systems or a number of memory devices assigned to or possessed by each participant, are desirably employed to maintain the participant records. As used herein, "central Links system" refers to any device or collection of devices which maintains one or more participant records, and/or determines game parameters, results, or capabilities that affect a participant or participants, corresponding to information in a participant record or records, or otherwise provided to the system.

Preferably, the successful completion of a given play element earns the participant a reward, which may include permission to proceed to the "next" play element or elements, while the participant's game status, progress, etc. is updated to reflect such completion. The reward may also include enhanced capabilities or knowledge that affects the participant's performance or experiences in the next play element or elements. The play elements are thus interlinked under the Links system. The Links system may further define a path network, course, quest, etc. along which the participant progresses while playing the associated game. Another preferred feature of Links is an overall story, plot, theme, etc. that unifies the play elements and attaches a significance to the successful completion of a given element, in terms of advancing the participant in his or her quest, or discovery of further aspects of the plot, theme or play world.

Definitions

As used herein, "play element" refers to an individual game or challenge that a Links participant is to complete. Play elements are the most basic components used in Links to define a course or path along which the participant proceeds. A number of examples of play elements are detailed below.

"Play module" refers to a group of 3-6 or more play elements that are physically or otherwise interlinked. The play module may link the play elements together under a common or aggregate scoring or record system. Generally, a participant must complete all (or a predetermined number) of the play elements, or acquire a requisite number of points within a play module, to proceed to the next play module.

"Play arena" refers to a group of 3-5 or more play modules that are generally (but not always) contained in a single large room or series of rooms, as may be convenient for purposes of scoring, theming, facility design, etc. As with a play module, a play arena may have a common or aggregate scoring or record system for the play elements and modules contained therein, and a required point total or number of completed elements/modules for advancement. A single Links facility may contain one or more play arenas.

"Play medium" or "play environment" refers to a format through which an individual play element is presented or communicated to a participant, and through which the participant interacts with the play element. Preferably, the Links system includes a number of play environments or media, each of which preferably supports a variety of play elements. Examples of play media/environments include Links facilities or play centers, home video game consoles, a home PC or other information appliance, the Internet, a Links website or chat room, a Links television show, etc.

"Central Links system" refers to any device or collection of devices that maintains one or more participant records, and/or determines game parameters, results, or capabilities that affect a participant or participants, corresponding to information in a participant record or records, or otherwise provided to the system.

Participant Identification and Record

Advantageously, each Links participant has associated with him/her some indicium of his/her progress in the game. Suitable indicia include a magnetic-storage card, RF card, floppy disk, CD-ROM, DVD or any other type of relatively small, inexpensive device that electronically (or otherwise) interfaces with a read or read/write device associated with a given play element to identify the participant and update the participant's record as necessary with his or her performance in the play element, and any resulting effect on the participant's progress or status in the game. Preferably, a toy such as a sword, ring, hat, key, magic wand, etc. incorporates interface equipment to provide a functional indicium which itself forms an enjoyable aspect of the game. Alternatively, a participant can carry a stylized photo identification card or Links passport which incorporates the proper interface. As yet another alternative, the indicium can comprise a password, username, or a combination of the two assigned to or chosen by a participant. Suitable input devices associated with the play elements can permit the participant to log in with the password/username so that the participant's performance at the element may be added to and/or influenced by information in the record maintained for the participant.

For each participant the Links system preferably maintains a record as necessary to reflect the participant's game status, progress, etc. The type of information contained in the record, as well as the location of the record may depend largely on the type of game played. For example, the record may contain data relating to which play elements the participant has successfully completed, the participant's performance in each element and the number of points or credits accumulated. In addition, the record may show a type of character the participant has selected for the game (e.g., a wizard, scientist, alien, dragon, astronaut, warrior, etc.) and a set of capabilities or aptitudes (such as magic, speed, intelligence, leadership, creativity) associated with the character or subsequently "developed" as a reflection of, or reward for, attaining a given performance level in a play element or elements, or successfully completing a defined task. Similarly, the record might show an inventory of items (e.g., a key, map, charm, weapon, book, vehicle, etc.) which the participant has "collected" or "purchased" in the course of playing the game, which collection or purchase may also be enabled by attaining given performance levels or completing tasks, or by the accumulation of points, credits, etc.

If desired, the indicium and record system may be further used to group participants into teams, with a record maintained for the team. The team record may represent a total of the points, credits, etc. of the team members or a composite team character with certain attributes and powers. Teams may be composed of a group of friends or family playing together at one Links play center, or participants at multiple centers who interact to achieve their goals, or compete against one another or other teams. Alternatively, Links teams may be assembled partly or wholly from home participants via the Internet or other electronic networks. As still another alternative, Links teams may be formed from a group of participants who are guests at a Links-themed party, for which special rooms may be provided at Links facilities.

Play Media/Environments

The Links system may encompass various play elements set in or carried out by wide variety of play media or play environments. For example, Links play elements can be located in Links facilities or "play centers" which preferably comprise multi- or single-story structures with a fairly large floor area (thousands or tens of thousands of square feet or more). However, smaller play centers are possible as well. A play center preferably houses a number of play elements arranged in a manner that is descriptive of their interrelation in the overall game, e.g. sequentially or grouped according to levels or type of challenge. The play elements housed in a play center may be individually linked to the central Links system, or interlinked with other play elements in the center in addition to the central Links system. Each center may serve as a stand-alone attraction, or can be linked with other centers or other Links play environments. The preferred center houses perhaps three or more game arenas, each of which may have five or more distinct play modules. Each play module comprises a number of a wide variety of play elements, which are discussed in more detail below.

Within a play center a participant can pass or "link" from one arena to another by the completion of some or all of the play modules in the arena, or the accumulation of enough points or credits in the arena. Similarly, a participant can link from one play module to another within an arena by the completion of some or all of the play elements in the module, or the accumulation of enough points or credits in the module. In a given module one or more play elements may require a participant to interact with another participant at a corresponding element in another play module, to help each other solve special problems or achieve a common goal to complete the element.

Each link between arenas or play elements may comprise a challenge connection such as a slide, rope bridge, trolley tracks, swinging bridges, net climbs and bridges, V-net bridges, web climbs and bridges, web slides and push/pull tracks. These challenge connections provide dexterity and physical play challenges.

A Links play center may employ one or more Links Gamemasters who may occupy a control room or rooms in the play center. The control room provides Gamemasters with access to some or all the computer, audio and visual systems in the play center. A Gamemaster can assume different roles in the interactive play, such as antagonist, joker, or mentor to the participants. The Gamemaster may monitor individual participants and assist, aggravate or tease them, give hints for play elements or cause a participant to get lost in a maze. In addition, the Gamemaster may organize special quests or games within the play center, for either an individual participant or teams of participants. Thus the Gamemaster can become the "personality" of the play center and make occasional live appearances, or become invisible to most or all participants.

Preferably, a given city or region has a number of Links play centers in different locations, and a Links game requires participants to visit many or all of the centers to complete a game by filling out certain aspects of their characters or completing all levels of the game. A collection of play centers, combined with other links play media and environments, comprises a "Links World." It is contemplated that each separate play center in a World will permit the participant to complete aspects of the game which are unique to that particular center. To facilitate this variety, each center may have a different theme, such as a medieval, western, or space theme. Within each center each game arena can have a sub-theme that fits into the overall theme. For example, in a medieval play center one arena may be themed as a castle, another arena as a city and a third as a dungeon. Alternatively, each arena within a center can have a different theme.

Another preferred play medium for the Links system is a stand-alone arcade-type game (possibly coin operated) which may be located in a game business or other public area which does not have an overall affiliation with Links. That is, a stand-alone game or a group thereof may be situated in an arcade, convenience store, shopping mall, etc. which has no overall affiliation with Links, and provided with a connection to the main Links system for participant and game data transfer. In addition, a Links stand-alone game may give a participant clues, hints, tips, etc. which may be useful when the participant plays in another Links environment, such as a Links play center.

It is also contemplated that Links may include play via home console or hand-held game systems such as the familiar PLAYSTATION, NINTENDO 64, DREAMCAST, GAMEBOY, and other similar products. Alternatively, dedicated or purpose-built home gaming systems could be employed. One option for employing this type of play medium is through Links-specific game CD-ROMs, DVDs, cartridges, or other software that the participant can purchase and play on the home game system as a Links play element or play module, with his or her score/result/etc. communicated to the central Links system. Where properly equipped, any of these home game systems may accomplish data transfer with the central system via a direct modem or network connection, or via the Internet. A home game system may also support a connection to Links through a read/write device that connects to the home game system and interfaces with the indicium described [above], so as to transfer data to and from the indicium to influence the participant's performance in the game, adjust game parameters, update the indicia with the player's performance or result in the game, etc. As with a Links stand-alone game, home console play may give a participant clues, hints, tips, etc. which may be useful when the participant plays in another Links environment, such as a Links play center.

Another preferred Links play medium is a home PC or other information appliance that interfaces with Links through the Internet or other network or modem connections. As with the home game system described above, the participant may purchase play element software to run on the PC or other appliance to participate in the play element. Alternatively, the participant could use the PC or other appliance to play Links games which are resident partly or wholly on a Links Internet server or website, Links mainframe or other machines connected to the participant's PC. By playing on a PC or other information appliance, a participant may find clues, hints, tips, etc., which may be useful when the participant plays in another Links environment. Preferably, the Internet or network connection is used to transfer game parameters, results, participant performance, etc. to update the participant's record. As with the home game systems described above, a read/write device can also provide an interface between the PC or other appliance and the indicium to update the participant's record as necessary.

Yet another preferred Links play environment is an interactive television show presented on broadcast or cable television, or available via home video or pay-per-view. Preferably, the Links television show is a combination game show and participatory TV program based on a Links game theme. The participants on the Links television show may face challenges or play elements similar to those found at Links play centers. Participants viewing the program can learn special tips and clues for completing their challenges or quests the next time they visit a Links play center. In addition, some or all of the Links play centers can hold competitions, the winners of which can then compete on the Links television show.

A Links feature film or series, presented in theatres, on broadcast television or on home video, is a further potential source of Links secrets, codes, tips, tricks, etc.

Yet another preferred Links play environment is a Creation Station which is a crafts area where participants may complete various play elements which involve construction of simple items. A Creation Station may be located in a Links play center or may comprise a stand-alone play environment.

Preferably, a Links website provides a center for the Links participant community to interact via chat or message forums, and look up player records, statistics and the like. The website may also contain Links news, secrets, tips, tricks, and other information. In addition, accessing the website may itself be a source of points for a Links participant; that is, a participant may gain a certain number of Links points, credits, character attributes, etc. for logging onto the website and engaging in various activities on the site.

It is also contemplated that Links players can accumulate Links points, credits, secrets, tricks, tips, etc. through the purchase of Links merchandise at stores which may be stand-alone or integrated into Links play centers as gift shops. Such stores may also be dedicated Links stores or existing retailers that sell Links items. Links merchandise may include T-shirts, computer games, video games, board games, and interactive toys. Similarly, participants may patronize integrated or stand-alone Links-themed restaurants, or existing family or fast-food restaurants promoting Links to receive Links points, etc.

Links preferably includes education in its play media environments, through play elements incorporating educational themes and otherwise. Some Links play elements, discussed in detail below, teach scientific principles, involve engineering or mechanics, include arts and crafts, or have a historic emphasis. Furthermore, Links may work in conjunction with programs such as ODYSSEY OF THE MIND to teach children creativity and problem solving. Preferably, an organized Links educational system includes teams of children from different parts of the country that compete against each other in educational activities simultaneously at different Links facilities.

FIG. 1 is a schematic depiction of a preferred arrangement of a Links World 100 contained in one Links play center. However, as mentioned above a Links World may comprise multiple play centers and/or multiple associated Links play environments. In addition, one must note that a wide variety of combinations, configurations, link patterns, etc. may be utilized in constructing a Links World 100, and that FIG. 1 represents just one possible World. The Links World 100 has a number of arenas 102 that are connected by arena links 104 which may comprise challenge connections as detailed above, or other types of connection. The arenas 102 are shown as being linked in a sequential or linear fashion; however other linking patterns are possible in which a given arena 102 may have links to multiple arenas depending on participant performance or choice. Within each arena 102 are a series of play modules 106 which comprise a number of play elements (not shown). The play modules 106 are themselves connected by module links 108 that define a path for the participant among the modules. Like the arena links 104 the module links 108 may comprise challenge connections, etc. As outlined above, it is preferred (but not necessary) that satisfactory completion of some or all of the play modules 106 in an arena 102 permit the participant to use the associated arena link 104 to proceed to the next arena.

FIG. 1 also shows a number of additional Links play environments in the form of home game systems 110, creation stations 112, stand-alone Links machines 114, home PCs 116 and television shows 118, which are associated with the Links play center in the Links World 100. Each of these is connected to one or more of the arenas 102 via supplementary links 120. Here the additional Links environments are depicted as play modules associated with individual arenas 102; however these environments may also be arenas or Worlds unto themselves, or play elements within or associated with a play module 106.

Play Elements

The Links system preferably supports a wide variety of play elements which can be combined in various ways to provide a very diverse play experience. The following is a description of various examples of Links play elements, which merely representative and not an exhaustive list of all possibilities. One of skill in the art can readily envision additional games and challenges that are suitable for inclusion as Links play elements, as well as the broad scope of play that can be made a part of Links. It is also to be appreciated that most or all of these play elements can be presented in a physical or "live" manner, or can be conducted through computer simulations with which the participant interacts.

Navigate the Maze

This play element involves two participants, one on an upper level platform overlooking a lower level where the other participant is positioned. A number of cards, preferably five, with arrow symbols are located in a pouch or other receptacle on the upper level. The participant on the lower level must travel a course or maze in a particular sequence and push a number, preferably ten, of buttons that are located throughout the course in the proper order. The correct order is shown on a graphic that is visible only to the upper-level participant. The upper-level participant displays the cards to the participant below to indicate which direction he or she is to go and which button to push. Once completed, the participant below, and the participant above may insert their cards or otherwise present their indicia at the same time for points.

Station Buttons

This play element involves two participants, one upper and one lower, not within visible range of each other. One participant faces a panel of (preferably) six buttons, each a different color. The other faces a color monitor. An intercom or other simple communication device connects the two stations. The participants insert their cards or otherwise present their indicia to start the play element and have thirty seconds to push the buttons in a proper sequence as shown on the monitor. The sequence may change each time and preferably has more colors for older participants. A similar play element or elements can be operated in another location in a play center, etc. and based on shapes, letters, numbers, textures, object names, etc. instead of colors. This play element may also be run at multiple locations with three or more people attempting to coordinate their actions.

Twenty Questions

This play element involves two participants at two different stations, one with a monitor, and the other with a keyboard or other buttons corresponding to the alphabet, both connected to an intercom. When both insert their cards or otherwise present their indicia, the monitor begins listing clues every few seconds, preferably every five seconds or so. The participants relate the clues to each other and discuss them until one participant keys in the correct name of the object at the station with the keyboard. Preferably, this element uses simple objects and clues for young people, and more difficult ones for older people.

Other Sites

In this play element interlinked video and/or computer stations connect two or more Links facilities via the Internet. Guests can simply chat with each other or solve common problems and puzzles. Some puzzles may require a participant to contact another participant at another site to get assistance, wherein the solution is only available at the remote participant's site.

Build a Wall

A participant must build a wall, preferably between two posts approximately six feet apart, using blocks that are preferably rectangular and approximately the same size as cinder blocks but much lighter in weight. Each age group may be required to complete the wall to a different height. For example, a three year old may build an eighteen inch wall, whereas an adult might build one six feet tall. Horizontal light sensors may be provided at various heights to sense when the job is complete. The size and shape of the blocks may be changed every few weeks so that the task varies and different skills will be required to master the building technique.

Build a Structure

The participant is provided with several pieces of balsa wood, tape, and paper clips. The participant must build a structure out of the materials that is preferably at least two feet high and will hold a fifty pound weight.

Build a Bridge

The participant is provided with several pieces of balsa wood, tape, and paper clips. The participant must build a bridge that preferably spans two concrete blocks three feet apart and will hold a twenty-five pound weight in the middle.

Simultaneous Cooperation

This play element involves several participants at different locations. Each must push a button simultaneously. Signage instructs them that one way to accomplish this is to start counting all together and to keep the count while the participants run to change locations.

Whack-a-Mole

The participant stands at a machine that has a number of openings in a substantially horizontal surface. The machine has a corresponding number of simulated moles that the machine causes to "pop up" out of the openings in a random manner. The participant must "whack" each mole with a mallet or other device as quickly as possible after the mole pops up. After the mole is whacked it lowers back beneath the horizontal surface, until the machine causes it to re-emerge from its opening, at which point the participant must whack it again. Points are awarded based on how quickly the participant can respond to and strike each mole.

Throwing Skills

The participant must throw bean bags or foam balls through different sized holes. Preferably, older participants are required to hit more, smaller holes from a longer distance.

Shooting Skills

Participants shoot blaster or laser guns at moving and stationary targets. Points are awarded for the number of targets hit in a given time period.

Targets

As a multiplayer version of Shooting Skills, a participant moves targets which other participants are attempting to shoot, making the targets harder to hit.

Ball Drop

This play element involves two participants, one on an upper level and one on a lower level. Foam balls are dropped from above, which must be caught in a net or passed through a hoop. The balls drop in to a fenced-off pit and are delivered back to the upper level via a manual conveyor.

Hide and Seek

A map is displayed to a number of participants, preferably five, and indicates where each must go. Each participant is thus sent to a different location. When a participant reaches his or her assigned location, he or she may insert a card in a reader or otherwise present an indicium, and then tries to be the first one back to the starting point.

Board Games

In a game parlor, Pictionary and various similar games may be provided for play, hosted by a Gamemaster. Points are awarded to winning teams accordingly. Preferably, games may be provided for various ages at various times.

Trivia

A monitor is provided with a set of buttons beside it. The participant selects a time period or other topic and is asked a number of questions, preferably six, from the chosen time period or topic. Preferably, difficulty is related to the participant's age. The participant earns points by getting a required number of questions correct.

Re-Creation

A participant dresses up as a figure from the past and helps to re-create a short play depicting a special moment in time. Parents are encouraged to participate as well, and photos of the dressed-up participant(s) may be made available for viewing, printout and purchase.

Rube Goldberg

The participant builds a "Rube Goldberg" contraption out of various parts which are provided, in order to accomplish a particular task. For example, the participant may need to cause a small steel ball to travel to a predetermined location across the room. As another example, the participant may have to raise a weight to a given height with a water jet as a source of power.

Gears

The participant must put a set of gears together in the proper sequence to turn a lever to open a door, passage or chamber leading to another play element or module.

Numbers

The participant must remember and repeat a specific sequence of numbers.

Colors

The participant must remember and repeat a specific sequence of colors.

Shapes

The participant must remember and repeat a specific sequence of shapes.

Musical Notes

An audio or audiovisual system plays a number of notes, preferably six, and the participant must play them back in sequence on a set of colored buttons in a given time, preferably thirty seconds or less.

Good and Bad

A monitor or Gamemaster asks a participant to respond to several ethical problems and scores the participant on his or her response.

Logic

A monitor or Gamemaster asks a participant to make logical assumptions and to draw conclusions from various statements. Points are awarded for drawing conclusions that are the most sound or the least obvious.

Odyssey of the Mind™

Hundreds of standard Odyssey of the Mind™ type problems are made available and materials supplied for completing the problems. Points are awarded for the skill, creativity, and completeness of the solutions made by the participants.

Computerized

A computer station may have many simple problems and games available for play. For example, some may be based on "Rube Goldberg" devices to show the effects of moving or altering various elements of the device. Other problems might be common sense, real-life based.

Piece Puzzles

A participant must fit pieces together in either an actual or computer-simulated puzzle. Preferably, older participants are assigned puzzles with more parts.

Logic Puzzles

A participant must determine how to connect point A to point B/C/D/E/etc. in the shortest possible distance.

Common-Thread Puzzles

The participant must determine what a number of things, preferably three or more, have in common, based on a picture, description or the like.

Keys Quest

A participant must find a number, preferably five, of golden keys, or tools or provisions needed to advance to the next level, module, or arena. The keys, etc. are hidden in many different locations. Some of them may be easy to find along familiar play routes, and the remaining ones may be well-hidden in nooks and crannies. Preferably, points are assigned for each key found. The key locations may be changed every week or so to provide variety.

Skill Quest

A participant must complete at least three of each of the following skills: Strength, Dexterity, Communications, Puzzles, and Memory.

Sequential Quest

A participant goes from one station to another, solving problems in a specific order to get clues for the next problem. Preferably, the participant solves a big problem at the end to win. Some problems might be geared towards boys, such as shoot-em-up's, and others would be for girls.

Scavenger Hunt

A participant must find people and articles. For example: one red-headed boy, one gold VISA card, one pair of penny loafers, etc. A participant must convince the owners to come with him or her, or allow him or her to borrow their belongings. Alternatively, the participant must find out the names of a certain number of the other participants in the area.

Gamemaster Quest

A participant must solve specific quests that the Gamemaster creates for a given day.

Multi-Quest

A participant must accumulate a certain number of points and/or keys to proceed, e.g. 250 points and two keys in Arenas 1 and 2 to enter Arena 3. Or a participant must accumulate 500 points and four keys to enter Arena 5 for a Grand Quest.

Pull Rope

A number, preferably four or five, of participants must pull a rope against a weight and hold the rope for a given time period, preferably thirty seconds or more. Older participants may be required to hold heavier weights.

Sledge Hammer

The standard carnival attraction is themed for Links. Preferably, participants of different ages must hit different levels to collect points.

Pulley Bridge

A wooden "raft" is provided that slides between an upper station and a lower station. Participants on either side must pull the raft back and forth while another participant rides on it. The participant riding the raft cannot move it himself and must work with participants on either side to get the raft across.

Race Cars

A participant must build a race car from materials provided and race against others on a downhill track. The winner of each heat wins points and a chance to race in a final heat.

Boats and Barges

A participant must build a boat from materials provided, that will hold the most people or cargo without sinking. A water tank, preferably a round tank with a diameter of eight feet or more, may be provided with interactive pumps and items for other water experiments.

Break-In

A participant uses an intercom at a special station to break into communications between two other participants who are trying to accomplish a mission.

Fake-Out

A participant controls a monitor at a phony station to play tricks on other participants who believe they are using it for a quest or a mission.

Surveillance

A video camera is located in an area that has an air blaster mounted under a grate. A participant sits in a remote location, waits for someone to walk over the grate and hits a button to activate the blaster and create a blast of air.

Video Gags

Remote cameras are located behind mirrors to catch participants making funny faces. Another participant sits at a console where he or she can select images and project them onto a large screen where everyone can see them.

I Spy

A participant uses glass prisms, periscopes, and telescopes to track and spy on people. Some of the people under observation are given a specific code which they try to keep secret while entering it into a terminal. The participant must try to learn the code for points.

Arena Quest

A participant must complete a new, more difficult quest in each arena. The participant learns of the new quests only after getting to the last arena.

Get the Bad Guy

A participant must shoot the "bad guy" at the end of a quest with laser guns, ball blasters, etc. The participant must have a certain number of strength and dexterity points and receives more shots with increasing points. The "bad guy" may be a character played by another participant or the Gamemaster or a target.

Skills

A participant must increase all of his skills to a pre-determined level to receive a reward.

Arena Configuration

Figure 2B:
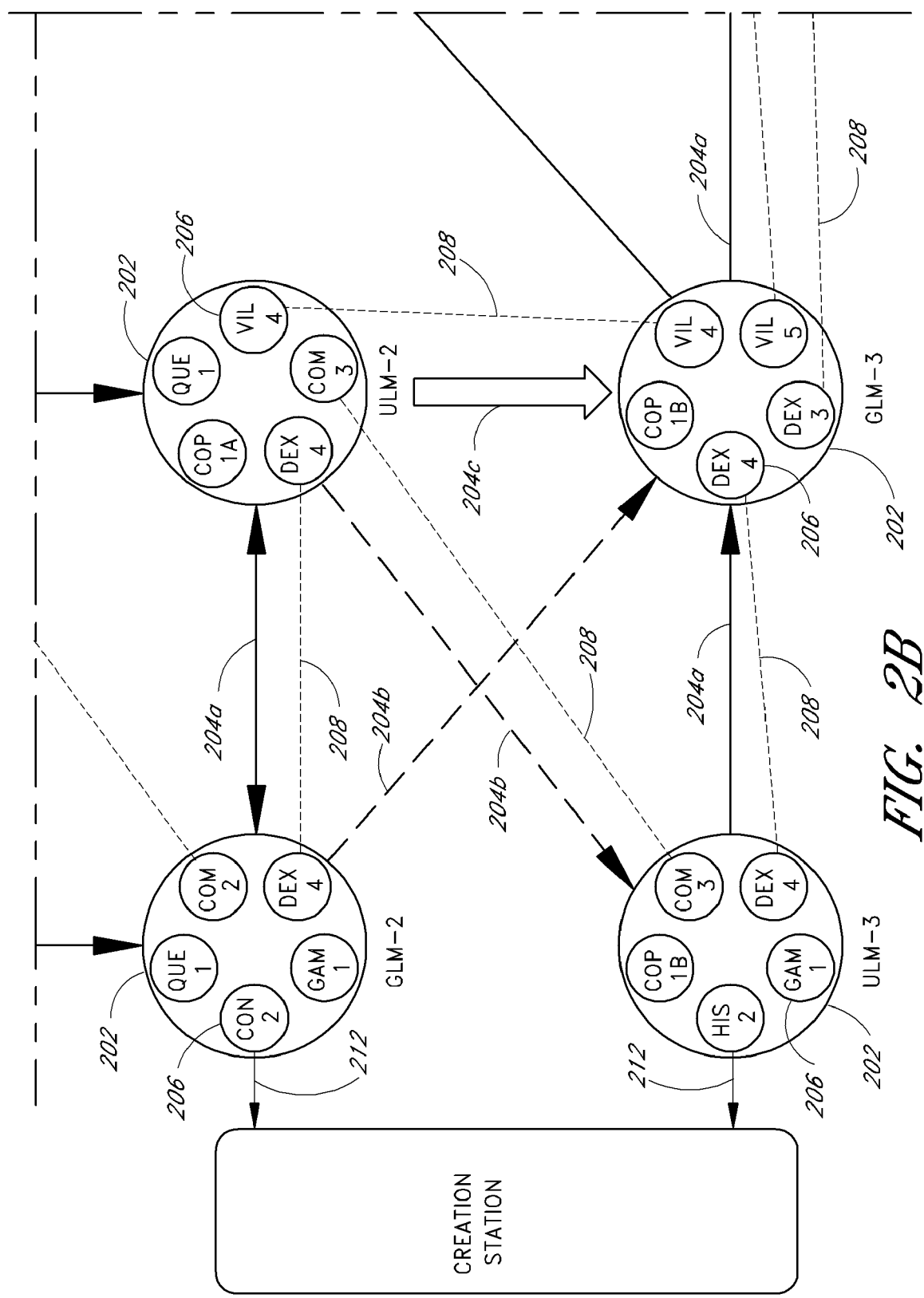
Figure 2C:
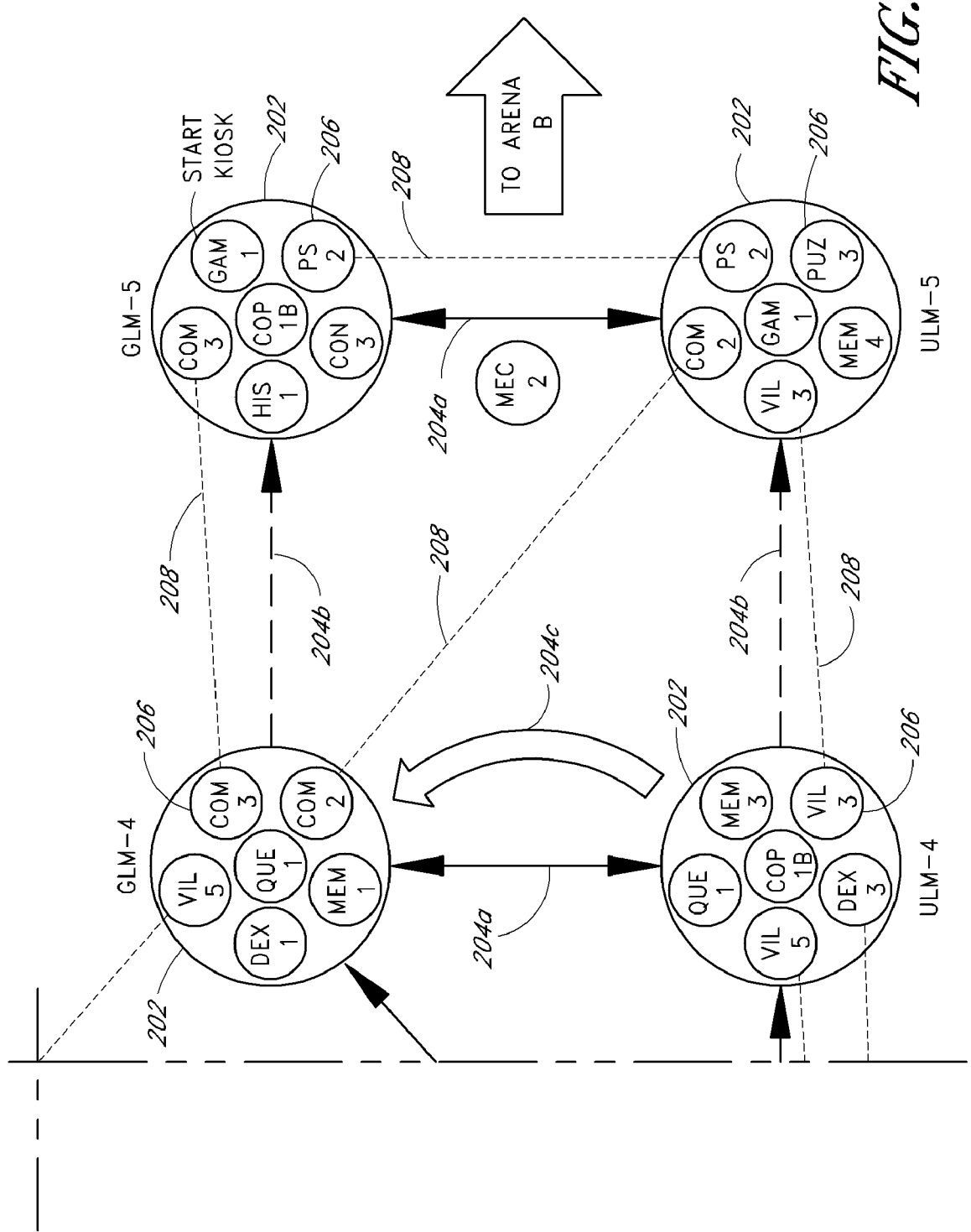

FIGS. 2 and 3 show schematically one preferred layout of a Links arena 200. However, one must note that a wide variety of combinations, configurations, link patterns, etc. may be utilized in constructing a Links arena, and that FIGS. 2 and 3 represent just one possible arena. With reference to FIG. 2, the arena 200 has a number of play modules 202 that are connected by module links 204a, 204b, 204c which may comprise challenge connections as detailed above, or other types of connections. The module links 204a, 204b, 204c comprise direct links 204a which permit the participant to advance upon completion of a requisite number of play elements 206 within the module 202; indirect links 204b which permit advancement only if the participant has accumulated enough points, credits, items, etc. either in the module 202 or in the game generally; and slide links 204c which connect modules located on an upper level to modules located on a lower level and permit one-way slide traffic downward.

The modules 204 and elements 206 are labeled according to the system shown in FIG. 3. The arena 200 shown in FIG. 2 has a two-story configuration; thus the modules 206 are divided into ground level maze or modules GLM-1 through GLM-5, and upper level modules ULM-1 through ULM-5. Preferably, the ground level modules involve application of basic skills, while the upper level modules test more advanced skills.

Each module 202 contains a number of play elements 206, each of which may comprise one of the play elements described above, or other play elements as may be devised in creating a Links arena. Each play element 206 is labeled to identify it according to type. FIG. 3 identifies the individual play elements corresponding to the labels in FIG. 2. The labels also indicate a class or group into which each play element falls: Communications (COM), Construction (CON), Cooperation (COP), Dexterity (DEX), Games (GAM), Historical (HIS), Mechanical (MEC), Memory (MEM), Problem Solving (PS), Puzzles (PUZ), Quests (QUE), and Villain (VIL).

As detailed above, a number of the play elements 206 require interaction between participants in separate modules 202. Thus FIGS. 2 and 3 show interactive links 208 connecting like elements 206 in separate modules 202, where the elements require interaction between participants. In the case of the play elements VIL-4 which comprise the "Surveillance" element, its interactive link 208 has an arrowhead to indicate the relative positions of the observer in ULM-2 and the person under surveillance in GLM-3.

The arena 200 also comprises a Creation Station 210. The arena 200 thus includes creative links 212 joining the Creation Station 210 with the play elements 206 which require the participant to use the station.

With the arena of FIGS. 2 and 3, or an entire Links play center, it is advantageous to include a number of preliminary areas through which participants may pass before entering the play space. For example, a participant may first enter a ticket counter area where a new participant can purchase a Links indicium and a ticket good for a certain amount of play time. A repeat participant may also purchase play time, and either a new or repeat participant could pay extra for additional Links points or credits.

New participants may proceed from the ticket counter area to a story booth which instructs the participants on the theme or story underlying the Links game. The story booth is preferably themed with graphics, photos and props, and includes a short video which details the story line of the quest or game that the participants are about to begin.

A programming booth preferably follows the story booth. In the programming booth the participants may enter identifying information (age, gender, hobbies, etc.) and select a character which is to be the participant's alter ego during the game. The character may be a composite of attributes selected by the participant, or it may be selected from a list of ready-made characters, or a combination of the two types. The participant selects an inventory of weapons, personal effects and character skills and may be shown on a video screen a composite photo of the character thus created. The participant may purchase a printout of this photo if so desired. The character information is made part of the record created for the participant, and is loaded onto the participant's indicium if it is of the memory-equipped type, or is saved in the central Links system.

From the programming booth a participant proceeds through a themed tunnel to the playspace entry 214 where the participant may view the arena 200 and identify the starting position and the goal or objective in the arena 200 or the game generally. The participant chooses between starting with the ground level maze/modules, or the upper level modules, and presents his or her indicia to proceed into the first module.

Figure 4:
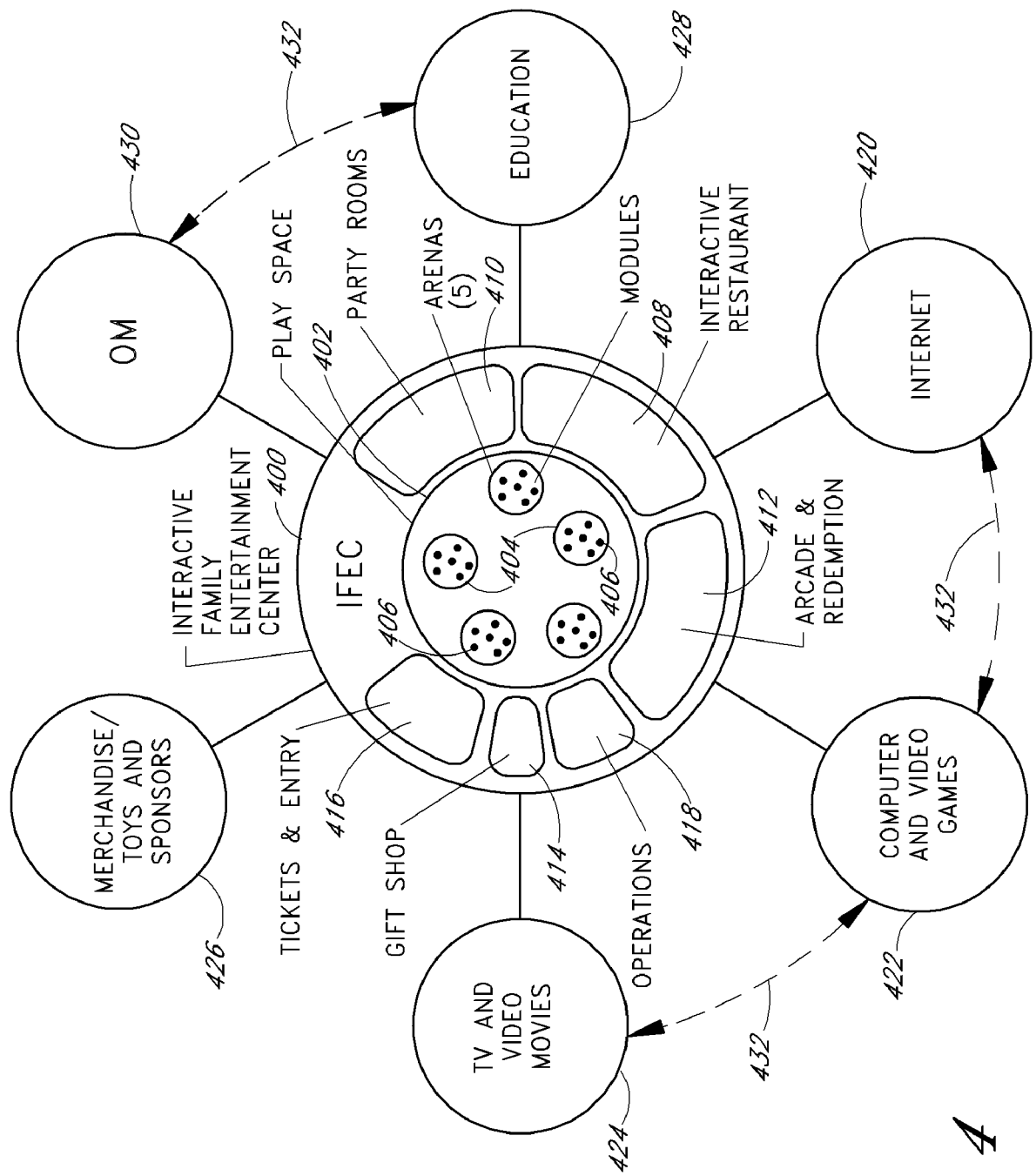
FIG. 4 is a schematic diagram showing the organization of a play center and associated play environments for use in a multi-media interactive play system.

FIG. 4 shows how a Links play center or Interactive Family Entertainment Center 400 fits into the overall Links organization. The core of the play center 400 is the play space 402, which contains play arenas 404 and play modules 406 within the arenas, as discussed in detail above. Preferably, the play center 400 also incorporates other areas to support additional Links play media. These include an interactive restaurant 408, one or more party rooms 410, an arcade/redemption center 412, where Links points/credits may be redeemed for merchandise and other incentives, and a Links gift shop 414. The play center further includes an entry and ticket-counter area 416, and an operations area 418.

FIG. 4 also shows additional Links play media or environments which are connected to the play center 400 but not necessarily a physical part of the center. These include play via the Internet 420, home video game systems 422, TV/home video 424, merchandise/toys 426, educational play 428, and play via ODYSSEY OF THE MIND type activities 430. A number of media links 432 show a close association between two or more of these play media, such as between educational play 428 and the Odyssey of the Mind 430, or between Internet play 420, home game system play 422, and TV/home video play 424.

Dream Masters Theme

DreamMasters is one example of a preferred theme or plot that can be applied to or carried out by the Links system, to provide a high level of participant involvement and interrelation between different play media encompassed by Links.

Overview

A complete fantasy adventure game is created in which a new toy, developed by a group of scientists, enables users to create, control and master their own dream states. The toy, called the DreamMaster Device (DMD) is, in reality, a major component of the Links play system. This device, which is preferably of a handheld size, emits and receives radio transmissions which activate play elements and record points, and sends and receives messages. By completing various play modules, participants become a part of an evolving fantasy game which encourages repetitive and continuous use of entertainment centers, the Internet, television and other media to reach higher, extreme levels of "dream creation."

The Story

The ability to master our fantasy dream world is now upon us. A brilliant group of research scientists who have been studying dreams for three decades have developed a unique technology, called the Dream Master Device (DMD). This device allows people of all ages to manipulate, power and create our own fantasy dream states. These scientists created DMD to give people the opportunity to visualize their most fantastic dreams. With intense training a person can use this amazing device to create magnificent worlds where he or she can fly, go on an exciting adventure, visit exotic places, become a super hero, a princess, a firefighter, a millionaire or even live in another time in history.

This powerful device is small enough to fit into the palm of your hand and puts out a highly advanced frequency that allows people to control their dreams. This device, however, is not easy to operate. Designing and creating your own dreams is considered an "art form" that requires many hours of hands-on training and fantasy skill development. Through interactive, highly specialized training methods, individuals learn how to use this miraculous device.

The Evil Force

While creating this technology, this elite group of scientists discovered that an evil force was trying to steal their technology and use it harmfully. If this secret technology was put into the wrong hands, dream making could become someone's nightmare (literally), or even worse, used for mind control. The scientists decided to go into hiding by keeping the location of their laboratory top secret and erasing their identities completely.

The scientists came up with a brilliant plan to share their incredible technology without exposing their identity. They would make the DMD available only to those willing to be specially trained in using the device. The DMD is introduced at special training centers. In order to use the device at its fullest potential, frequent visits to the training center are necessary. These centers then train users to become skillful at manipulating color, sound, communication, conflict resolution, social interaction, story telling, fantasy development, role playing, problem solving, physical agility and intellect and more, all of which are important skills in creating incredible dream states.

The way the training centers work is that dream masters-in-training are given their own DMD which they carry with them at all times while learning dream creation. The device itself is not fully "loaded" with the appropriate software and actually needs to go through the training process with its "owner." As the owner develops his or her skills in dream creation, the device's technology becomes increasingly more sophisticated and capable of producing vivid dream states realized though audiovisual equipment, virtual reality hardware and software, force and vibratory feedback equipment, scent and temperature generation equipment, etc.

At first, a new DMD user can only achieve very basic dream creation; i.e. silent black and white stick figures. As the user participates in several training sessions and achieves new skill levels, the DMD is programmed to allow for increasingly dynamic visual and auditory dream creation including full color, realistic backgrounds in 3D, high adventure options, auditory and sensory effects, and sophisticated character development. The highest level of dream mastery allows for extremely complex story development with 3D, surround sound and tactile experience (temperature, vibration and scents).

The Dream Masters

A creative, smart and talented group of kids became remarkably proficient in using the Dream Master Device. So proficient that they had reached the most extreme level of dream making and began their own special group over the Internet to chat, share techniques, ideas, and their newest dreams with each other. These kids, aged five through seventeen, live in different countries throughout the world such as the U.S., Australia, Japan, England, Egypt, and Mexico. The kids communicate often and have named themselves the DreamMasters Elite. For several months the research scientists kept a close eye on this talented bunch. The scientists began to make contact with the DreamMasters Elite by sending them secret messages on their DMDs. Given their exceptional abilities to use the technology, the scientists began trusting this group of kids with very guarded information. The Dream Masters Elite are now the scientists' only links to the outside world, and more importantly, their finest protectors against the evil forces.

The Dream Master Device

This unique handheld toy is able to transmit and receive radio frequencies from anything capable of putting out or receiving a signal including television, radio, computer systems and networks linked to RF modems or transmitters, videotape and DVD machines connected to transmitting equipment, fixed locations (Links facilities) and other DMD devices. The DMD preferably has a tiny screen that is able to receive messages and images. For example, while playing with a software program or watching a television show messages can be picked on the DMD and viewed on the tiny screen by the user.

In addition, the DMD device can be programmed like a smart card. More specifically, within the Links facilities, this device can be tracked by an internal system that interfaces with the central Links system to record the play and activities of the participant. A participant's record can be downloaded onto a personal disk or file that can be stored for continued play. The DMD can also transmit signals to other DMDs. When in the company of another DMD owner, a participant's DMD can signal the participant who may then send a message to the other DMD owner.

The Links Play Centers—Dream Zone (DZ)/Fantasy Factory

These specially designed Links play centers become the hub of the interactive game play. In the play centers the Links system combines interactive event arenas based on the DreamMasters story. Preferably, the play center is outfitted with radio frequency reading and transmitting devices that interface with the DMD.

The play center has several play arenas highlighting the development of specific skills in the dream creation process. The climax is a Fantasy Finale where a participant enters a computerized personal viewing booth where he or she can download data from his or her DMD, and create and view a dream fantasy with specially designed software. The content and complexity of the dream fantasy vary with the participant's level of progress in the DreamMasters story or game.

Entrance and Programming Booth

The entertainment experience starts with the purchase of a DMD (repeat participants have the contents of their DMDs downloaded into the central Links system). Participants then proceed to the story booth where new participants are told about the DMD and how to use the play center. Repeat participants are updated with the latest news. The participant may input specific goals that he or she wishes to reach and the DMD is programmed to respond to and receive information corresponding to the selected goals. The participants receive a suggested itinerary to help them reach their goals and may then proceed to the first play arena or module.

Dream Master Modules

The play center has a number of training modules that develop specific skills in dream creation. As the participant completes an interactive training module, his or her DMD is tracked by the RF system and performance and experience information is input into the central Links system.

There may be several training modules to explore and levels to reach. Each module focuses on a set of related dream creation skills. The modules may also have the ability to accommodate different levels of play for specific age groups or repeat users. For example, a very young child will be given less difficult games to play, focusing on simple play and exploration. More complicated game play would be designed for older children and even adults. Repeat participants would be challenged with more difficult games as they increase their skill level within each module. Within a module, the DMD may automatically activate the appropriate game difficulty setting according to age or skill level.

Only an elite group of highly trained dream masters will be given clues to the identity and location of the dream scientists.

Module A: Dream Device Activation and Protection

The DreamMasters storyline applicable to this module states that participants are to learn the basic skills in manipulating their DMD. This includes sharpening their reflexes, increasing their memory skills, and tapping into their creative problem solving and creative capabilities to exploit the full capabilities of the DMD. Special instruction and training is given to the participant to recognize danger and to use conflict resolution skills to protect the technology as well as himself or herself. There are provided several levels within these modules in which repeat visits and acquisition of skills allow the participant to take part in higher level interactive experiences. For example, an advanced level may allow the user to play games that require more sophisticated conflict resolution and/or combat skills for protecting the DMD.

Some of the play elements include: a pong game in which participants wear biofeedback devices that manipulate a control on a video screen that depicts the game; a maze game in which participants can manipulate figures to guide them to the exit; the Station Buttons game described above; reflex oriented games such as Musical Notes; conflict resolution games; problem solving games such as Build a Wall; Whack-A Mole; Shooting Games; Gears; video games to train users on how to recognize the Evil Force and how to protect the technology; and Good and Bad.

Module B: Life Form Creation

In this module individuals learn skills in developing life forms. Starting with a first level, the participant learns how to create a human in their likeness. Participants must go through a process that teaches their DMD about themselves, and as they proceed onto more difficult levels they can add more people, animals, create new identities, and add emotions, humor and other personality traits that make the experience feel very real.

Some of the play elements include: scanning in the participant's image; "describe yourself" games; games in which the participant stands in front of a green screen and a video system makes them appear to fly over mountains, scuba dive, surf a wave, become a king, be younger, etc.; electronically recording a participant's physical movement so that it can be used for dream making; communication games such as Navigate the Maze; interactive, socially oriented games that build skills in conducting conversation or scripting interplay between characters; personality and character development games (such as create a hero, create a joker, create a villain); and group games in which several participants make walking, talking "techno-people" interact with each other on a large display screen.

Module C: Scenery Creation

This module teaches the participant how to create unique backgrounds, color, scenery, environment and visual beauty. The first level is in black and white, and the participant progresses to higher levels that allow him or her to create 3D images and "real time" environments.

Some of the play elements include: Musical Notes; mixing paint colors to get a specified shade; a large paint screen with stations where several people can create scenery as a group; games focusing on learning to create environments using software such as ADOBE PHOTOSHOP or COREL DRAW, programmed adventures to different places to increase awareness about possible escapades; using simulation technology to grow a tree, make a rainstorm/tornado/hurricane, erupt a volcano, etc; and a group scenery creation game in which several people are given specific items to make up a scene and have several minutes to design it.

Module D: Sound and Sensory Creation

This module trains the participant in many experiences of sound development and sensory creation. Lower levels begin with simple percussion sounds, and a final level facilitates full "surround sound" and elaborate sound effects, music and sensory experiences.

Some of the play elements include: games that require a participant to listen and track sound in a "sound maze"; a scent maze; Musical Notes; games that require a participant to read music; silent video to which the participant may add sound effects; orchestra games in which each player interacts to make a musical event or composition; a "Stomp" game in which participants create percussion using household items; games permitting the use of biofeedback technology to control the temperature; and video compositions to which a participant adds special sensory effects such as temperature and wind control.

Module E: Story Creation

This module instructs the participant on how to create a full-length story with a plot, scripting, interaction, characters, events and fantasy.

Some of the play elements include: role-playing games; green-screen character Karaoke games; scriptwriting games like MAD LIBS; plot development games; "end the story" games; "start the story" games; group story telling; games which challenge the participant to tell the best ghost story or the best funny story; and assembling a story line from video captures made of people in the entertainment center over the course of a predetermined time interval, preferably one hour.

Dream Download Center

At the conclusion of play, participants enter the Dream Creation center to download data from their DMDs and see how well they did in reaching their skill development goals. They are then able, according to their newly achieved level, to create a 2-minute dream on a software program. The dream is recorded and given to the participant on a floppy disk. All information is stored in the central Links system. This Dream Creation center has the latest technology including 3D screen viewing, virtual reality, surround sound and sensory effects for the highest levels of dream making.

Internet Cafe

This open-design eating area has a large screen of eight by eight feet or more for participants to join multi-site games, view the Links television show and take part in group Internet chat experiences.

Retail Store

Here a participant can buy the latest software related to the Dream Creation process. Software is available for any game that the participant may have played in the center. The software also interfaces with the participant's DMD. Participants may also buy special carrying pouches, key chain holders, backpacks, etc. that hold, protect and accompany the DMD. Also available are videotapes and DVDs of the Links television series and special toys that are used by the main characters in the TV show.

The Television Series

Every week the group of kids that make up the DreamMasters Elite star in their own television series. The show is about the kids' ordinary lives in their countries, in their homes, going to school, playing with friends and having a normal day. But in a matter of minutes their lives become very unordinary when they receive a secret message on their DMD asking them to participate in a quest. They all assemble via the Internet where the scientists explain the challenge for the day. The kids use their creative powers and DMD abilities to solve the problem and bring balance to the world once again. At the end of the show, one kid from the DreamMasters Elite shares with the other kids his or her latest dream creation the television audience to enjoy. As the series develops, new members (real kids) who have reached DreamMasters Elite levels of dream making are given the opportunity to have their dream shown on TV. Throughout the show, secret messages are also sent to the viewers through their DMDs.

The Computer Software

Software is designed to mimic the experiences in the Links play center as well as quests depicted on the television show. In addition, dream-making software is available for designing very intense dreams and fantasies. The software also interacts with the DMD, sending kids secret messages throughout the game.

Website

The DreamMasters website features chat forums, DreamMasters Elite Club, etc. The DMD may interface with the website as well.

Send/Receive Radio Frequency System

Figure 5:
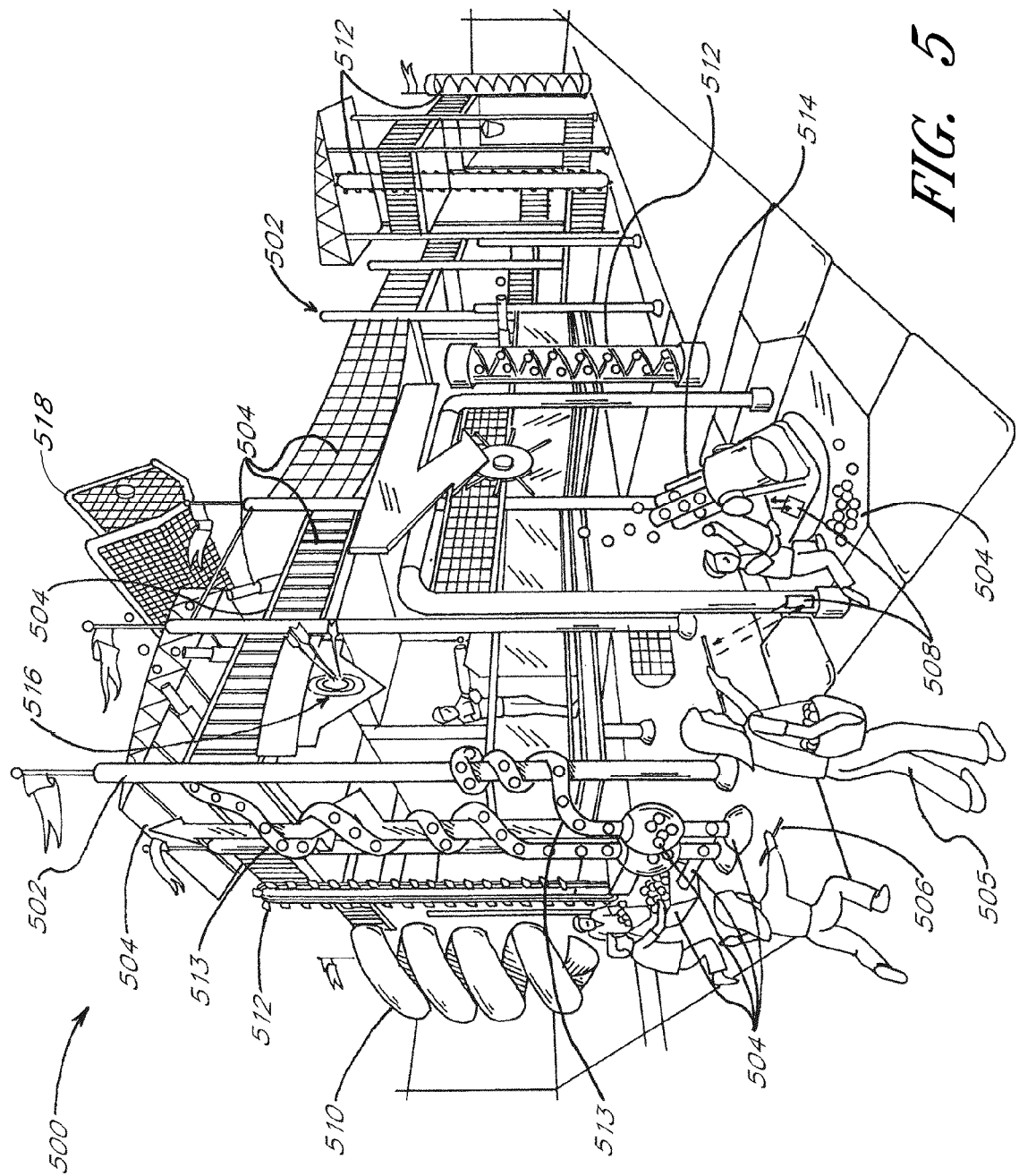
FIG. 5 is a perspective view of a play structure that incorporates a send/receive radio frequency system to track participants in the play structure.

FIG. 5 shows a play structure 500 suitable for use in a Links facility as a play element, module, or arena. The play structure has a supporting framework 502 and a variety of play equipment 504 mounted on or around the play structure 500. Participants 505 carry a Links indicium 506 (wand, sword, ring, etc.) while playing at or neat the play structure 500.

A send/receive radio frequency ("SRRF") system is provided to facilitate an interface between the Links indicia 506 and the central Links system. The SRRF system comprises (1) an indicium 506 carried by a Links participant 505, (2) a network of fixed transceivers 508 installed throughout the play structure 500 or other Links facility, (3) a standard LAN communications system, and (4) a master computer system (possibly the central Links system itself) interfaced to the transceiver network.

Preferably, the indicium 506 and transceiver 508 use a novel SRRF communications protocol. SRRF is an RF-based communications technology and protocol that allows pertinent information and messages to be sent and received to and from two or more SRRF compatible devices or systems. While the specific embodiments descried herein are specific to RF-based communication systems, those skilled in the art will readily appreciate that the broader interactive play concepts taught herein may be realized using any number of commercially available 2-way and/or 1-way medium range wireless communication devices and communication protocols such as, without limitation, infrared-, digital-, analog-, AM/FM-, laser-, visual-, audio-, and/or ultrasonic-based systems, as desired or expedient.

The SRRF system can preferably send and receive signals up to 40-100 feet between indicia 506 and the fixed transceivers 508. The system is preferably able to associate an indicium with a particular zone as defined by an indicium activation area approximately ten to fifteen feet in diameter. Different transceiver and antenna configurations can be utilized depending on the SRRF requirements for each play station or element. The SRRF indicia 506 and transceivers are 508 networked throughout the play structure 500 or other facility. These transceivers 508 can be hidden in or integrated into the facility's infrastructure, such as the walls, floors, ceilings and play element equipment. Therefore, the size and packaging of these transceivers is not particularly critical.

In a preferred embodiment, an entire entertainment facility is configured with SRRF technology to provide a master control system for an interactive entertainment play environment using SRRF-compatible indicia and/or tracking devices. A typical entertainment facility provided with SRRF technology may allow 300-400 or more participants to more-or-less simultaneously send and receive electronic transmissions to and from the master control system using an indicium or other SRRF-compatible tracking device.

In particular, the SRRF system uses a software program and database that can track the locations and activities of up to a hundred or more participants. This information is then used to adjust the play experience for the participant based on "knowing" where the participant/player has been, what objectives that player has accomplished and how many points or levels have been reached. The system can then send messages to the participant throughout the play experience. For example, the system can allow or deny access to a participant into a new play element/module/arena based on how many points or levels have been reached by that participant and/or based on what objectives that participant has accomplished or helped accomplish. It can also indicate, via sending a message to the participant, the amount of points or specific play objectives necessary to complete an element, module, etc. or enter the next level of play. The master control system can also send messages to the participant from other participants.

The system is preferably sophisticated enough that it can allow multiple participants to interact with each other, adjusting the game instantly. The master system can also preferably interface with digital imaging and/or video capture so that the participants' activities can be visually tracked. Thus any participant can locate another participant either through the video capturing system or by sending a message to another device. At the end of a visit, participants are informed of their activities and the system interfaces with printout capabilities to provide a hard copy thereof.

Suitable embodiments of the SRRF technology described above may be obtained from a number of suitable sources, such as AXCESS, Inc. and, in particular, the AXCESS active RFID network system for asset and people tracking applications. In another preferred embodiment the system comprises a network of fixed transceivers 508 installed at specific points throughout a Links facility. Participants are outfitted or provided with a reusable indicium 506—a standard AXCESS personnel tag clipped to their clothing in the upper chest area. As each participant enters a specific interactive play area or "game zone" within the facility, the participant's indicium 506 receives a low frequency activation signal containing a zone identification number (ZID). The indicium 506 then responds to this signal by transmitting both its unique token/indicium identification number (TID) along with the ZID, thus identifying and associating the participant with a particular zone.

The indicium's transmitted signal is received by a transceiver 508 attached to a data network built into the facility. Using the data network, the transceiver 508 forwards the TID/ZID data to a host computer system. The host system uses the SRRF information to log/track the guest's progress through the facility while interfacing with other interactive systems within the venue. For example, upon receipt of a TID/ZID message received from Zone 1, the host system may trigger a digital camera focused on that area, thus capturing a digital image of the player which can now be associated with both their TID and the ZID at a specific time.

In this manner the SRRF technology allows the master control system to uniquely identify and track people as they interact with Links games and activities in a semi-controlled play environment. Optionally, the system may be configured for two-way messaging to enable more complex interactive gaming concepts.

The indicium 506 may also include the ability to produce light, vibration or other sound effects based on signals received through the SRRF module. In a more advanced implementation, the indicium 506 may be configured such that it is able to display preprogrammed messages of up to 50 characters on a LCD screen when triggered by participant action (e.g. button) or via signals received through the SRRF module. This device is also preferably capable of displaying short text messages transmitted over the SRRF wireless link from another Links device.

Preferably, the SRRF transceiver 508 is capable of supporting medium range (10-40 feet) two-way communications between SRRF indicia and a host system, such as a PC running special Links software. This transceiver 508 has an integral antenna and interfaces to the host computer through a dedicated communication port using industry standard RS232 serial communications. It is also desirable that the SRRF transmission method be flexible such that it can be embedded in television or radio signals, videotapes, DVDs, video games and other media, stripped out and re-transmitted using low cost components. The exact method for transposing these signals, as well as the exact interface between the home transceiver and common consumer electronics (i.e. TVs, radios, VCRs, DVD players, A/V receivers, etc.) is not particularly important, so long as the basic functionality as described above is achieved. The various components needed to assemble such a SRRF system suitable for use with the present invention are commercially available and their assembly to achieve the desired functionality described above can be readily determined by persons of ordinary skill in the art. If desired, each SRRF transceiver 508 may also incorporate a global positioning ("GPS") device to track the exact location of each play participant within one or more play environments.

Most desirably, a SRRF module can be provided in "chip" form to be incorporated with other electronics, or designed as a packaged module suitable for the consumer market. If desired, the antenna can be embedded in the module, or integrated into the toy and attached to the module. Different modules and antennas may be required depending on the function, intelligence and interfaces required for different devices. A consumer grade rechargeable or participant replaceable battery may also be used to power both the SRRF module and associated toy electronics.

Links Indicium

Preferably, a transmitter/receiver utilizing the SRRF technology is provided in a small and portable package that can be carried or worn by play participants. Most preferably, the SRRF transmitter/receiver is incorporated into or embodied in a Links indicium 506 that can be operated by play participants by waving, shaking, stroking and/or tapping it in a particular manner to actuate a particular desired function or effect. These operational aspects must be learned by play participants as they train in the various play environments. The ultimate goal, of course, is to become a "grand wizard" or master of the indicium 506. This means that the play participant has learned and mastered every aspect of operating the indicium 506 to produce desired effects within each play environment. Of course, additional effects and operational nuances can (and preferably are) always added in order to keep the interactive experience fresh continually changing.

Optionally, the indicium 506 or other SRRF device is configured so that it is able to display 50 or more characters on a LTD or LCD screen. Similarly, the indicium 506 or other SRRF compatible device may also be configured to display desired light, vibration and/or sound effects in order to complement the operation of the indicium and/or the effects achieved. Optionally, the SRRF protocol can use a transmission that can be adapted to computer software, television and video programming so that the SRRF system can be easily implemented using TV, radio and/or computer software. For example, a Links indicium 506 instrumented with SRRF technology can interact with a Links software program running on a PC connected to a SRRF transceiver.

FIG. 5 also depicts a variety of play equipment which may be used in creating a Links play element, structure, or arena. This equipment includes a slide 510, ball conveyors 512, ball distribution conduits 513, ball cannon 514, a projectile target 516, and ball collection nets 518.

Interactive Play Systems

Figure 6:
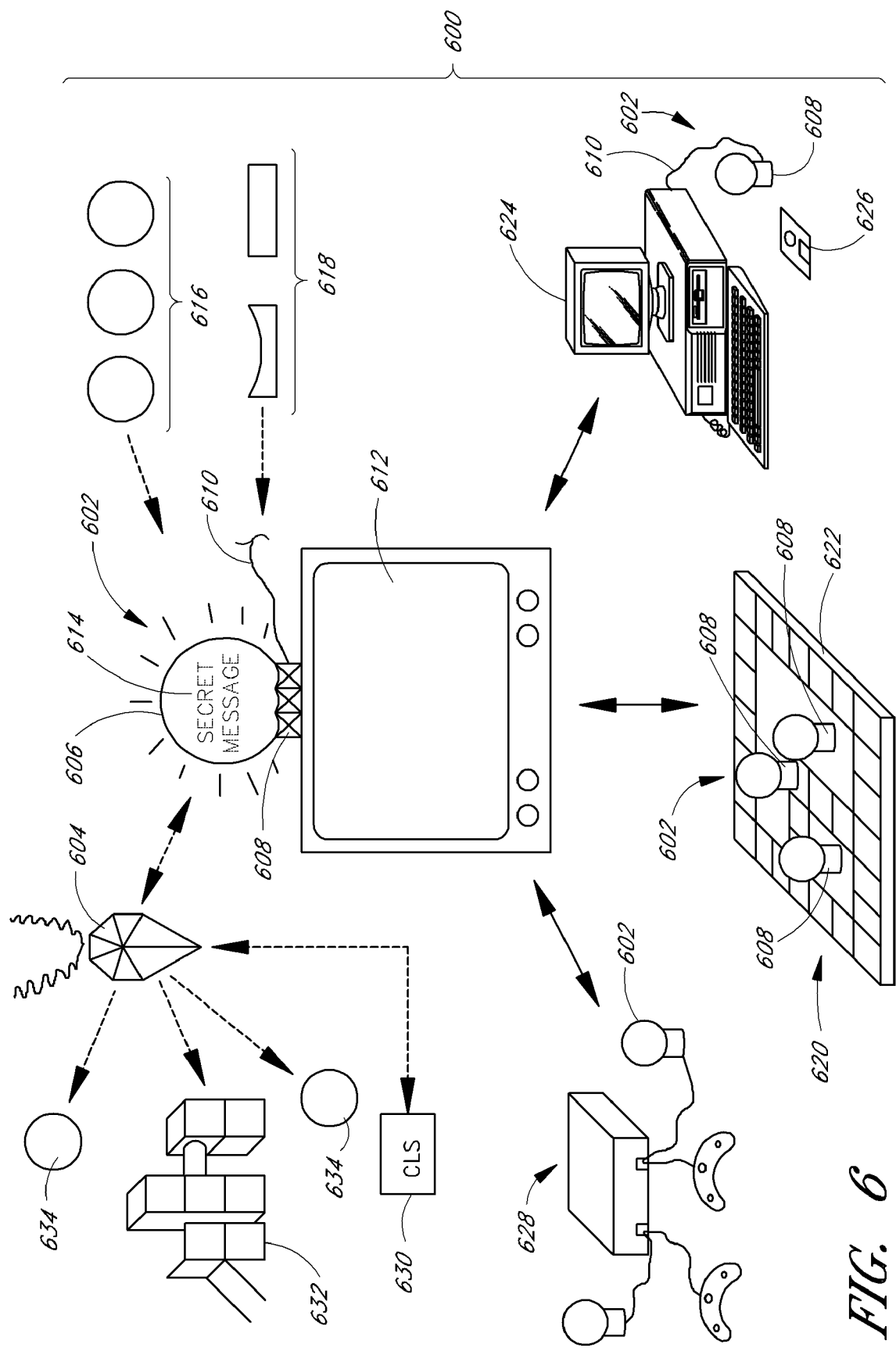
FIG. 6 is a schematic view of an interactive play system having features in accordance with another preferred embodiment of the invention.

FIG. 6 depicts another preferred embodiment of an interactive play system 600 having features in accordance with the invention. This play system 600 incorporates a simulated crystal ball assembly 602 and/or a crystal necklace 604 that serve as a Links indicium within the play system 600. The crystal ball assembly 602 comprises a crystal ball 606 that serves as a visual communication device, and a transmitter/receiver in the form of a base 608. The ball 606 and base 608 are connected so that signals received by the base 608 can be displayed as alphanumeric, graphic or other types of information on or in the ball 606. The base 608 can receive signals through a base interface 610 that preferably comprises one or more of an RF airwave receiver, coaxial cable, modem, ethernet, or serial connection, or any other type of data/signal connection known to those skilled in the art. The base interface 610 may connect the base 608 to a television 612 as one way of using the crystal ball assembly in conjunction with the Links interactive television show detailed above. The base 608 preferably has a memory device (not shown) in the form of a standard RAM chip or chip set, flash memory, magnetic or optical disk, or any other suitable memory device known to those skilled in the art. The memory device may record all previous play activities of the participant to facilitate the assignment of a skill or experience level or a set of attributes, a point total, etc. to the participant or the participant's character, corresponding to the activities completed. This earned/assigned skill level, attribute set, etc. may in turn be recorded on the base memory device.

The television 612 is one example of a play medium that is usable with the crystal ball assembly 602. At a predetermined time, for example several minutes, before the Links television show begins, the base 608 receives a signal from the television or from some other signal or data connection. Upon receipt of the signal the base 608 causes the ball 606 to glow (for example) and subsequently display a secret message 614. The secret message 614 may impart certain knowledge to the person watching the program about events that will happen or have already happened that will assist and guide the person through specific adventures, activities, or actions. Upon completion of these or of other actions within a Links game, the participant may obtain additional or more advanced versions 616, 618 of the crystal ball and/or base 618. These more advanced versions may have special abilities beyond the basic versions 606, 608 used previously.

The advanced versions 616, 618 of the ball/base, as well as an updated/enhanced participant level or skill set, facilitate repeat value of a given episode of the Links television show. When a repeat episode is broadcast, a participant who has reached a new level or obtained the upgraded ball/base, will receive a different secret message 614 on the ball/base. The new secret message may contain additional secret information needed to continue in the Links game or adventure, thereby potentially casting the events occurring on the Links television show in an entirely new light.

In addition to engaging in play activities with the television, the participant may take the crystal ball assembly 602 to another location or activity and continue the adventure or actions in a new play medium. The secret-message feature of the crystal ball 606 may be used to direct the participants to one or more of these additional play media or locations. In the new play medium/location the participant can exploit the skills and attributes that have been added, by the completion of prior activities, to her crystal ball assembly/other Links indicium/character. These skills and attributes are thus used in the new medium or location to further the participant's actions in another environment.

One example of such a play medium is a board game 620 in which the participant places her crystal ball assembly 602 on a board 622 next to those belonging to other participants. The bases 608 of each assembly can then communicate with each other to assist or hinder other players in the board game 620. The outcome of the game may then be decided in part by the information that each crystal ball assembly 602 gained while engaging in one of the prior Links activities, or from one of the other assemblies during the board game. For example, a first player's base 608 might send information to a second player's base providing clues to questions or choices that the second player will encounter later in the game. These "clues" may be true (actual clues) or false (bluffs), depending on prior achievements of the first or second player in earlier Links activities, as recorded in his base 608. Or the second player may be able to "call" the "bluff" if he has gained certain knowledge in earlier Links activities.

Another suitable play medium is a computer game, internet chat room, or internet game. In this play medium the crystal ball assembly 602 or other Links indicium is connected to a computer 624 via the base interface 610 or other suitable connection such as a port connection of the type used to connect a keyboard or mouse to the computer 624. Software 626 may be obtained that allows the participant to expand the capabilities of the base 608 or a character associated with the participant by engaging in and completing various activities and challenges on the computer/internet.

A console-type video game 628 is another play medium that may be used with the crystal ball assembly 602, or other Links indicia as detailed above. One or more crystal ball assemblies 602 are connected to the video game 628 via the base interface 610 or other suitable connection. In the video game 628 the participant can further use and develop the skills and attributes gained in prior activities, by participating in a game designed specifically for use with Links and the crystal ball assembly or other Links indicia.

To participate in Links activities in other play media, a participant may be required to travel to different locations, such as Links facilities, play arenas, restaurants, etc. The secret-message feature of the crystal-ball assembly 602 may be used to direct the participant to a "training center" or some other Links facility for skill development, new experiences, etc. Other remote locations include a library or government facility, theme park, family entertainment center, shopping mall, store, etc., that is equipped with electronics supporting Links. To facilitate this travel, the participant might upload the necessary information from the crystal ball assembly or other Links indicium to a more portable Links indicium such as the crystal necklace 604, a radio-frequency card, a magnetic-strip card, or a standard RAM or flash-memory chip small enough to be placed in an item that can be attached to clothing, worn, or placed in a pocket. The crystal necklace 604 or other portable Links indicium is preferably small enough to be easily carried or worn by the participant, but large enough to contain the necessary electronics to interface with the crystal ball assembly 602 and the Links system at a Links facility or other remote location.

When the participant reaches the Links facility, he or she interfaces the crystal necklace 604 or other portable Links indicium with the central Links system 630 (or portion of the central Links system) that serves the Links facility in question. This interface is preferably accomplished by presenting the crystal necklace, swiping a card, plugging in a memory-chip device, etc. Thus the participant/character experience level, attributes skills, points, etc. are transferred to the central Links system 630. These data are used by the central Links system to affect game parameters and outcomes for the participant as he engages in a series of Links play elements in a play structure or arena 632 or other Links play media 634 housed in the Links facility. Alternatively, the participant may purchase or consult a "magic book" or other item at the facility that contains secret knowledge or tricks to be used later in the game, or in operation of the crystal-ball assembly 602. The results of, and experience, points, skills, etc. gained in, the play elements or other experiences are then uploaded to the crystal necklace or other portable Links indicium when the participant exits the Links facility. The updated data could then also be transferred from the crystal necklace 604, etc. to the crystal ball assembly 602.

A further aspect of the play system 600 may be a defined ultimate goal, such as reaching a certain status known as GAMEMASTER, or to earn an appearance on the Links television show. Upon reaching this goal, the participant may be presented with the further goal of becoming one of the best players on the show, either for a given season or for all time.

Figure 7:
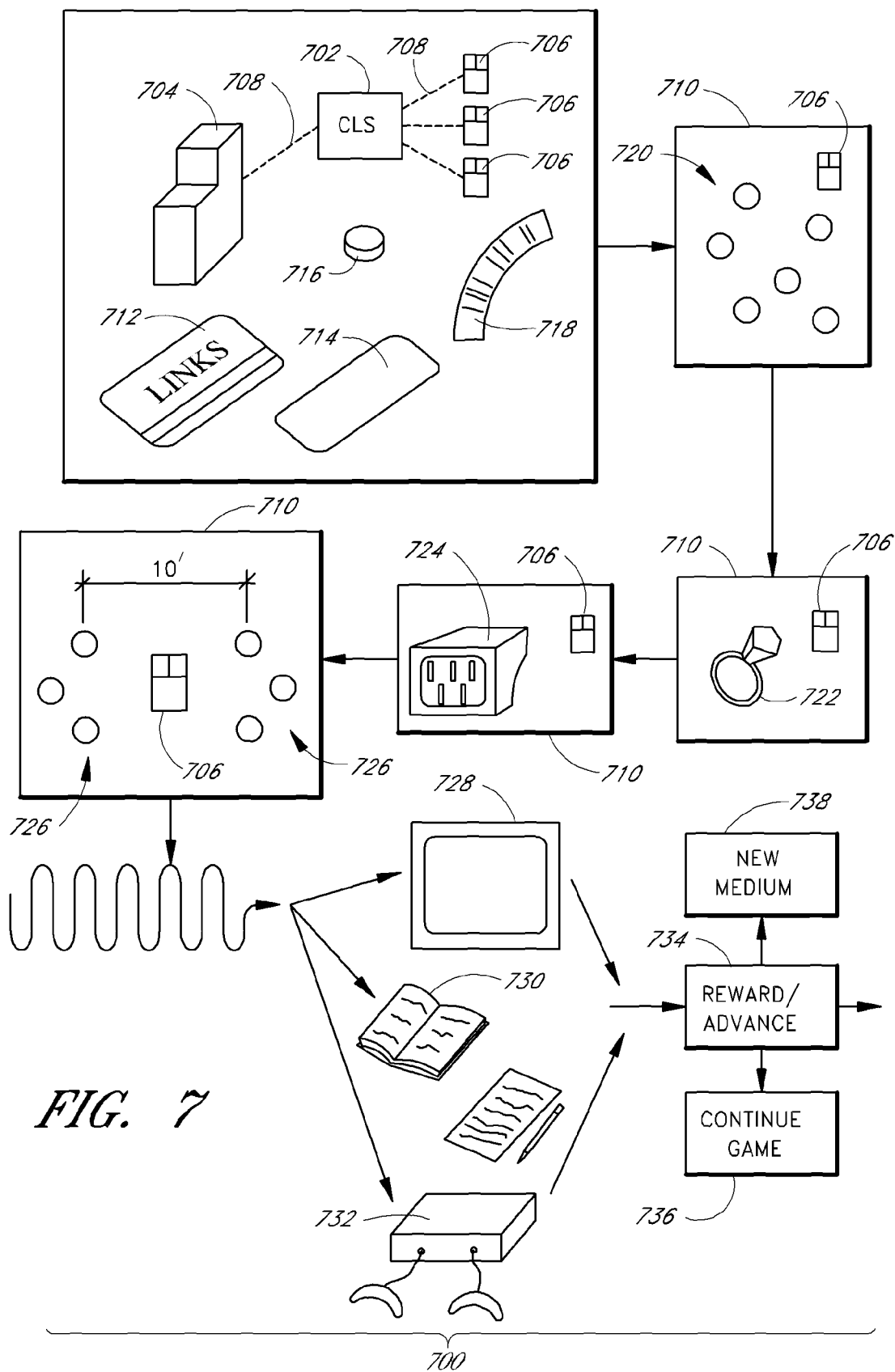
FIG. 7 is a schematic view of an interactive play system having features in accordance with another preferred embodiment of the invention.

FIG. 7 depicts another preferred embodiment of an interactive play system 700. The play system 700 comprises in part a central Links system 702 that is connected to one or more entrance terminals 704 and a number of local terminals 706 via a series of data links 708. The local terminals 706 are each situated in or near a Links play element 710, a series of which make up a Links play module or arena. The data links 708 preferably comprise serial connections such as RS232 or RS485, ethernet or modem connections, or any other suitable network links for communicating data. Any of these links may be hardwired or may have intervening RF connections.

Each participant is issued a Links indicium in the form of a magnetic strip card 712, a radio-frequency card 714, an I-button 716 or a barcoded wristband 718. The entrance terminal 704 may sell/issue the indicium to new participants and query them on information such as the participant's name, age (used to set difficulty levels, etc.), vital statistics and preferences. These data are then added to a record created for the participant in the central Links system 702 and/or on the indicium itself. Returning participants present their indicia to be read by the entrance terminal 704, which receives data from the indicium. Where the indicium comprises a magnetic-strip card 712, the card is presented to the entrance terminal by (for example) swiping the card through a card reader built into the entrance terminal 704. The data received by the entrance terminal preferably allows it to identify the participant with a record maintained in the central Links system 702 of the participant's skill/experience level, character type/attributes, points, achievements, etc. Alternatively, the received data may comprise this entire record itself.

The play elements 710 preferably define a path along which the participant proceeds after completion of the necessary activities at the entrance terminal 704. Each play element 710 has an associated local terminal 706. Upon the successful completion of each play element, the participant swipes her card 712 or otherwise presents her indicium to be read by the local terminal 706. Depending on the participant's performance in the play element, the local terminal 706 and/or central Links system 702 awards the participant a certain amount or type of experience, points, character attributes, etc.

One play element contemplated for use in the play system 700 requires the participant to push a group of colored buttons 720 in a particular sequence. Successful completion of this task could earn the participant 50 points. In another play element, the participant must find a hidden object such as a piece of jewelry 722. Points may be awarded for simply finding the object or based on the amount of time needed to find it. Another play element requires the participant to answer trivia questions that are presented on a touchscreen device 724. Still another play element involves two or more participants who must work together by pressing a series of buttons 726 simultaneously and in the correct order. Preferably, more points are awarded at such play elements where multiple participants must complete activities together.

At some point during the play sequence, the participant may arrive at a point where he preferably cannot proceed without additional input or information from outside the particular play environment, be it a Links facility or other area that supports Links technology. The participant is then required to visit another play environment or watch a television show 728 to find clues or hints to a question or riddle. The participant may also be required to research a particular subject in books 730 in a library, or play a video game 732 and achieve certain objectives. Once the assigned task is completed, the participant receives a reward 734 and is given the choice of continuing the game 736 or advancing to another play medium 738 to experience the game in a different way. In this manner, the Links system advantageously encourages play participants to engage in different activities and enjoy other experiences.

Figure 8:
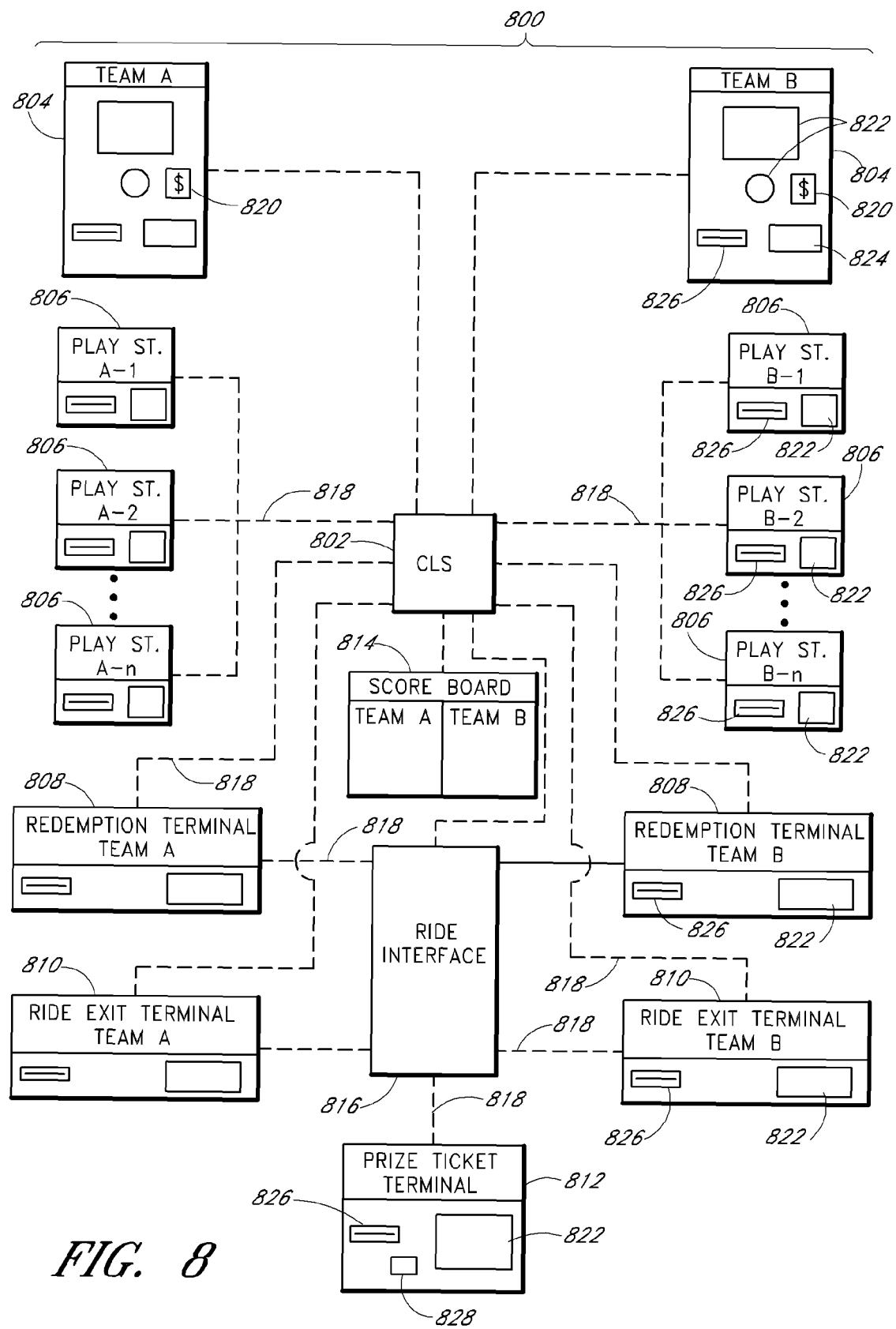
FIG. 8 is a schematic view of an interactive play system having features in accordance with another preferred embodiment of the invention.

FIG. 8 depicts another preferred embodiment of an interactive play system 800. The play system 800 may serve as an interactive addition to a theme-park ride, to provide interactive play to participants waiting in line to board the ride. However, this play system 800 can also be a stand-alone attraction to provide an advanced "treasure hunt" game, with no reference (in terms of points or other performance rewards) to any subsequent ride or attraction.

The play system 800 includes a central Links system 802 which is connected to two or more entrance terminals 804 and to two or more sets of local terminals 806. The central Links system 802 is also connected to two or more redemption terminals 808, two or more ride exit terminals 810, a prize ticket terminal 812, a scoreboard 814, and a ride interface 816. The ride interface 816 is also connected to the redemption terminals 808, the ride exit terminals 810 and the prize ticket terminal 812. A series of data links 818 provides the connections between the central Links system 802 and the other components of the play system 800. The data links 818 preferably comprise serial connections such as RS232 or RS485, ethernet or modem connections, or any other suitable network links. Any of these data links may be hardwired or may have intervening RF connections. The play system 800 is depicted as having a number of mostly direct data links 818 from the various terminals, etc. to the central Links system 802. However, it will be appreciated that the present invention comprehends other patterns for interconnecting the various devices making up the play system 800, so long as the resulting network supports the necessary communications among the devices. For example, a token-ring system could be used, or intervening hubs or controllers could be interposed to handle communications between the central Links system 802 and a number of grouped devices, such as the local terminals 806 serving Team A.

The central Links system 802 preferably comprises a PC server having an advanced Pentium® processor or equivalent. The server should be Fast Ethernet capable with a 56K modem and at least two RS232 ports. An 8 point Fast Ethernet hub is preferred for interlinking the central Links system with some or all of the outlying devices in the play system 800.

The central Links system 802 preferably maintains a database of participant records and other information relevant to operation of the play system 800. For each current participant, the database contains a record that may comprise some or all of the following: first name, last name, a participant "unique key," age, total point score, points available for redemption, and play station visit information (including numbers of stations visited number and corresponding time stamps). A similar record of historical data may be maintained for past participants, for a predetermined time period such as one year. An all-time top-10 database may be maintained, with a record maintained for each member of the top-10 having some or all of the following fields: rank number, first name, last name, an all-time top-10 "unique key," age, total point score, and date. The corresponding records in a daily top-10 database have some or all of the following fields: rank number, first name, last name, a daily top-10 "unique key," age, and total point score.

The play system 800 contemplates an initial division of participants into two teams, Team A and Team B. One alternative player division involves a LOONEY TUNES theme and divides players into Roadrunners and Coyotes. Thus the system includes two or more entrance terminals 804, one for each team of participants. Each entrance terminal 804 accepts the required amount of money from a new participant and queries the participant for personal data such as name, age, etc. The entrance terminal 804 includes a coin/bill acceptor 820 to receive the money and appropriate I/O devices 822 such as a monitor, keyboard, speaker, touchscreen, etc., to communicate with the participant. When this payment/data-entry stage is complete the entrance terminal 804 issues the new participant a Links indicium such as a magnetic-strip card with the participant's name and other data recorded on it. The magnetic-strip card is presented to the participant via a card dispenser 824. The participant data is passed to the central Links system 802 for the creation of a record for that participant. A repeat participant swipes his magnetic card in a Links card reader 826 built into or connected to the entrance terminal 804 to register as a member of Team A or Team B and begin play. The repeat participant may also be required to insert money into the coin/bill acceptor 820.

The local terminals 806 are located in one or more play areas to which the participants proceed after interacting with the entrance terminal 804. The embodiment shown in FIG. 8 is set up to handle two separate teams of participants; however, the local terminals can be located in a single play area for all participants where there is no division into teams, or in three or more areas as necessary. Here, the play areas for each of Team A and Team B have a number n of local terminals 806 that are associated with a like number of play stations A-1 ... A-n, and B-1 ... B-n. In one preferred embodiment n=9, so that each play area has 9 local terminals 806 and corresponding play stations. Preferably, within the play area each local terminal 806 is in a hidden location so that the participant's task is to find all of (or as many as possible of) the local terminals 806, or hidden objects adjacent the local terminal. Alternatively, each local terminal is associated with a play station or play element comprising one or more of the interactive play elements disclosed above. A preferred layout for the play area has the local terminals 806 positioned on platforms that are located from 5 to 40 feet apart and interconnected with nets, bridges, ladders and slides.

Upon successfully finding a local terminal 806 or otherwise completing the play element at the play station associated with the local terminal, the participant swipes her magnetic-strip card in a Links card reader 826 in the local terminal 806. The local terminal 806 passes the participant information to the central Links system 802 for validation and ascertainment that a required time interval has passed since the last time the participant visited the station. If these requirements are met, the local terminal 806 plays a short audiovisual presentation, preferably in the form of an audio message indicating that the participant has just received 50 points and the illumination of a green LED, on I/O devices 822 in the local terminal 806. Of course, other audiovisual presentations, such as a short video or computer animation displayed on a monitor screen, a light show, etc. are possible as well.

The participant accumulates a number of points by finding as many of the local terminals 806 as possible, or otherwise successfully completing the associated play elements. Preferably, signs are posted near the local terminals 806 and elsewhere in the play area that detail the benefits or "powerups" that the participant receives at the end of the play area for earning a given number of points. These "power-ups" are used by the participant in the ride or attraction associated with the game, to enhance his ride experience or to increase his chances of winning a race (and additional points for victory or beating a set time). Whether the play system 800 has an associated ride or attraction, or functions a stand-alone game, the points may subsequently be used at a booth to purchase prizes.

The participants may purchase the power-ups or other benefits at the redemption terminals 808 located at the end of the play area or at the beginning of the ride. The participant swipes her card in a Links card reader 826 on the redemption terminal 808 and, after the central Links system validates the participant's identification, her total points and other data are displayed via appropriate I/O devices 822. The participant selects one or more of the power-ups for which she is eligible, preferably by pressing one or more of a series of buttons incorporated in the I/O devices 822. The redemption terminal 808 displays the selections made by the participant, who can choose to accept the selections or clear them and start over, by pressing appropriate buttons. When the final power-up selections have been made, the redemption terminal 808 communicates them to the ride interface 816, which causes the ride control system (not shown) to implement the participant's powerups while the participant is on the ride, providing her with additional capabilities or experiences corresponding to the selected powerups. To confirm the selection of powerups, the I/O devices 822 may play a short audio or audiovisual presentation.

Upon completion of the ride, the participant may earn additional points depending on how the participant places in a race or whether the participant beats a predetermined time standard. Thus, at the ride exit terminal, the participant swipes his card in the Links card reader 826 and is awarded a certain number of points corresponding to his performance in the ride. The ride exit terminal may acquire performance and/or points data from the ride interface 816 or the central Links system 802. To confirm the points award, the I/O devices 822 may play a short audio or audiovisual presentation.

At the prize ticket terminal 812 the participant may convert his earned points into prize tickets or other currency that may be used to purchase prizes, or directly into prizes. The prize ticket terminal 812 is equipped with a Links card reader 826, I/O devices 822 to facilitate communication with the participant, and a ticket dispenser 828.

The scoreboard 814 interfaces with the central Links system 802 and can display a variety of statistics to enhance the participants' enjoyment of the game. The displayed statistics may include: an all-time top 10, today's top 10, each team's current point total, points earned by individual members of each team, or any combination of these statistics. The scoreboard 814 may display each of these in turn for a predetermined time interval, or occasionally flash funny or encouraging messages or graphics. The scoreboard 814 may comprise a centralized display or a number of individual displays distributed throughout the play area.

One of skill in the art will appreciate that the play system 800 can be re-configured to support a stand-alone, advanced "treasure hunt" or similar game. To facilitate this game, the central Links system 802 is preferably connected to one entrance terminal 804, one set of local terminals 806 and, optionally, one exit terminal 810 and one scoreboard 814. In the "treasure hunt" game the participants pass through the entrance terminal 804 in the usual manner to the play area, where they must locate the local terminals 806 or hidden objects nearby. The participants swipe their cards in the local terminals 806 in the usual manner to accumulate points. When finished, the participants may visit the exit terminal 810 to claim a final total of points.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above, but should be determined only by a fair reading of the claims that follow.

What is claimed is:

1. A method for providing a live-action interactive game, the method comprising:
    providing a play participant with a game token comprising a machine-readable unique identification number uniquely identifying the play participant within said game, wherein the game token comprises a card, passport, tag or wristband;
    providing first, second and third reader devices in association with corresponding first, second and third interactive gaming devices distributed throughout a live-action play environment, each said first, second and third reader device configured to wirelessly and electronically read said game token to thereby obtain said unique identification number, and each said first, second and third reader device comprising an input/output device;
    providing a first clue to the play participant using a first input/output device of said first interactive gaming device, wherein the first clue is provided, at least in part, in response to obtaining the play participant's corresponding unique identification number using said first reader device;
    providing a second clue to the play participant using a second input/output device of said second interactive gaming device, wherein the second clue is provided by video or computer animation such that the play participant obtains the second clue by viewing the video or computer animation; and
    providing a third clue to the play participant using a third input/output device of said third interactive gaming device, wherein the third clue is provided, at least in part, in response to the play participant completing a challenge, wherein the challenge is at least one of: finding a hidden item, finding another play participant, solving a puzzle and learning new information.

2. The method of claim 1, wherein providing the first, second and third reader device comprises providing at least one reader device based on a wireless communication medium selected from the group consisting of: RF, infrared, laser, visual, audio and ultrasonic.

3. The method of claim 2, wherein said at least one reader device comprises an RF reader or a barcode reader.

4. The method of claim 1, wherein said interactive game comprises an electronic treasure hunt or scavenger hunt.

5. The method of claim 1, further comprising capturing one or more digital images or videos of the play participant while said play participant is playing said game.

6. A live-action interactive game for entertaining or amusing multiple play participants playing in a live play environment, said interactive game comprising:
    multiple game tokens adapted to be worn, carried or held by said multiple play participants, each said game token comprising a machine-readable unique identification number configured to uniquely identifying each said play participant within said game, wherein at least one of said multiple game tokens comprises a card, passport, tag or wristband;

a plurality of reader devices adapted to be provided in communicative association with a corresponding plurality of interactive gaming devices, said reader devices and gaming devices configured and adapted to be distributed throughout the live play environment, each said reader device configured to wirelessly and electronically read each said game token to thereby obtain the unique identification number;

at least one of said plurality of gaming devices comprising at least one input/output device configured and adapted to selectively reveal or provide to each said play participant a game-relevant clue, information or item based, at least in part, on the play participant's successful completion of a selected game challenge comprising at least one of: finding a hidden item, finding another play participant, cooperating with another play participant, solving a puzzle, and entering a secret code or password, wherein said entering a secret code or password is performed on an input/output device of said at least one gaming device;

whereby said multiple play participants are able to play and progress in said game and wherein the participation and progress of each said play participant in the game is individually tracked according to each said corresponding unique identification number.

7. The interactive game of claim 6, wherein at least one of said plurality of reader devices comprises a wireless communication device configured and adapted to communicate through a communication medium selected from the group consisting of: RF, infrared, laser, visual, audio and ultrasonic.

8. The interactive game of claim 7, wherein said at least one reader device comprises an RF reader device or a barcode reader device.

9. The interactive game of claim 6, wherein said game comprises an electronic treasure hunt or scavenger hunt.

10. The interactive game of claim 6, further comprising a digital camera configured and adapted to capture one or more digital images or videos of said play participants while said play participants are playing said game.

11. The interactive game of claim 6, wherein at least one of said plurality of interactive gaming devices is configured and adapted to selectively reveal or provide said game-relevant clue, information or item by displaying a video or computer animation on said input/output device such that the play participant obtains the game-relevant clue, information or item by viewing the video or computer animation.

12. The interactive game of claim 6, wherein at least one of said plurality of interactive gaming devices is configured and adapted to selectively reveal or provide to each said play participant said game-relevant clue, information or item based at least in part on each said corresponding unique identification number.

13. The interactive game of claim 12, wherein said at least one interactive gaming device is configured and adapted to selectively reveal or provide to each said play participant said game-relevant clue, information or item based at least in part on determining the game progress or achievements associated with said corresponding unique identification number.

14. A live-action interactive game for entertaining or amusing a plurality of play participants playing in a live play environment wherein each play participant is provided with a game token comprising a machine-readable unique identification number that uniquely identifies each said play participant within said play environment, said interactive game comprising:

a plurality of reader devices adapted to be provided in communicative association with a corresponding plurality of interactive gaming devices, said reader devices and gaming devices configured and adapted to be distributed throughout said live play environment, each said reader device configured to wirelessly and electronically read each said game token when said game token is provided within readable proximity to said reader device to thereby obtain the unique identification number of the game token corresponding to a particular play participant associated with said game token;

at least one of said plurality of gaming devices comprising at least one input/output device configured and adapted to selectively reveal or provide to each said play participant a game-relevant clue, information or item based, at least in part, on the play participant's successful completion of one or more selected game challenges;

a digital image capture system comprising at least one digital camera configured to be in communicative association with at least one of said plurality of reader devices and configured and adapted to automatically capture one or more digital images of said play participants and to store said captured digital images in association with said corresponding unique identification number for each of said play participants; and a digital image retrieval system configured to retrieve, display or print said captured digital images using said unique identification number to identify or select said one or more captured digital images;

whereby said play participants are able to play and progress in said game and wherein the participation and progress of each said play participant in the game is individually tracked and recorded according to each corresponding unique identification number and wherein captured images of each said play participant is tracked, identified or selected according to a corresponding unique identification number of each said play participant.

15. The interactive game of claim 14, wherein at least one of said plurality of reader devices comprises a wireless communication device configured and adapted to communicate through a communication medium selected from the group consisting of: RF, infrared, laser, visual, audio and ultrasonic.

16. The interactive game of claim 15, wherein said at least one reader device comprises an RF reader device or a barcode reader device.

17. The interactive game of claim 14, wherein said game comprises an electronic treasure hunt or scavenger hunt.

18. The interactive game of claim 14, wherein at least one of said plurality of interactive gaming devices is configured and adapted to selectively reveal or provide said game-relevant clue, information or item by displaying a video or computer animation such that the play participant obtains the game-relevant clue, information or item by viewing the video or computer animation.

19. The interactive game of claim 14, wherein at least one of said plurality of interactive gaming devices is configured and adapted to selectively reveal or provide to each said play participant a game-relevant clue, information or item based at least in part on each said corresponding unique identification number.

20. The interactive game of claim 19, wherein said at least one interactive gaming device is configured and adapted to selectively reveal or provide to each said play participant a game-relevant clue, information or item based at least in part on determining the game progress or achievements associated with said corresponding unique identification number.

21. The interactive game of claim 14, wherein at least one of said selected game challenges comprises: finding a hidden item, finding another play participant, cooperating with another play participant, solving a puzzle, or entering a secret code or password.

* * * * *

UNITED STATES PATENT AND TRADEMARK OFFICE
CERTIFICATE OF CORRECTION

PATENT NO. : 8,342,929 B2
APPLICATION NO. : 12/829905
DATED : January 1, 2013
INVENTOR(S) : Briggs et al.

Page 1 of 1

It is certified that error appears in the above-identified patent and that said Letters Patent is hereby corrected as shown below:

In the Specification

In column 8 at line 27, Change "below," to --below--.

Signed and Sealed this
Thirtieth Day of July, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,342,929 B2 | Page 1 of 1 |
| APPLICATION NO. | : 12/829905 | |
| DATED | : January 1, 2013 | |
| INVENTOR(S) | : Briggs et al. | |

It is certified that error appears in the above-identified patent and that said Letters Patent is hereby corrected as shown below:

In the Claims

Column 28 at line 67, Claim 6, change "identifying" to --identify--.

Signed and Sealed this
Eighteenth Day of March, 2014

Michelle K. Lee
*Deputy Director of the United States Patent and Trademark Office*